(12) United States Patent
Naito et al.

(10) Patent No.: US 10,350,762 B2
(45) Date of Patent: Jul. 16, 2019

(54) AUTONOMOUSLY MOVING BODY, MOVEMENT CONTROLLING METHOD, AND RECORDING MEDIUM STORING MOVEMENT CONTROLLING PROGRAM

(71) Applicant: Panasonic Intellectual Property Corporation of America, Torrance, CA (US)

(72) Inventors: Eiichi Naito, Kyoto (JP); Takenobu Aoshima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/831,490

(22) Filed: Dec. 5, 2017

(65) Prior Publication Data

US 2018/0178391 A1    Jun. 28, 2018

(30) Foreign Application Priority Data

Dec. 22, 2016    (JP) ................................. 2016-248869

(51) Int. Cl.
*B25J 11/00*    (2006.01)
*B25J 9/00*    (2006.01)
(Continued)

(52) U.S. Cl.
CPC ........ *B25J 11/0085* (2013.01); *A47L 11/4011* (2013.01); *A47L 11/4061* (2013.01);
(Continued)

(58) Field of Classification Search
CPC ... B25J 11/0085; B25J 9/0003; G05D 1/0291; G05D 1/0219; G05D 1/0214;
(Continued)

(56) References Cited

U.S. PATENT DOCUMENTS

| | | | |
|---|---|---|---|
| 2010/0049374 A1* | 2/2010 | Ferrin | G05D 1/0227 701/1 |
| 2015/0153738 A1* | 6/2015 | Al-Buraiki | G05D 1/0295 701/117 |

(Continued)

FOREIGN PATENT DOCUMENTS

| | | |
|---|---|---|
| JP | 2013-248065 | 12/2013 |
| WO | 2002/101477 | 12/2002 |

*Primary Examiner* — Rodney A Butler
(74) *Attorney, Agent, or Firm* — Greenblum & Bernstein, P.L.C.

(57) ABSTRACT

A cleaning robot which performs a predetermined task while autonomously moving includes: a driver which makes the cleaning robot move; an image capturer which detects a movement state indicating whether a different cleaning robot existing in front of the cleaning robot is moving along an obstacle, a direction in which the different cleaning robot exists relative to the cleaning robot, and a distance between the cleaning robot and the different cleaning robot; and a following run controller which controls the driver in order for the cleaning robot to move following the different cleaning robot while keeping a position diagonally behind the different cleaning robot at an opposite side of the different cleaning robot from the obstacle, if the movement state indicates that the different cleaning robot is moving along the obstacle.

14 Claims, 20 Drawing Sheets

(51) Int. Cl.
   *G05D 1/02*   (2006.01)
   *A47L 11/40*  (2006.01)
(52) U.S. Cl.
   CPC .......... *B25J 9/0003* (2013.01); *G05D 1/0214* (2013.01); *G05D 1/0219* (2013.01); *G05D 1/0291* (2013.01); *A47L 2201/04* (2013.01); *G05D 2201/0203* (2013.01); *Y10S 901/01* (2013.01)
(58) Field of Classification Search
   CPC ......... G05D 2201/0203; A47L 11/4061; A47L 11/4011; A47L 2201/04; Y10S 901/01
   See application file for complete search history.

(56)            References Cited

U.S. PATENT DOCUMENTS

2017/0139423 A1*   5/2017   El Ferik ............... G05D 1/0295
2017/0361468 A1*  12/2017   Cheuvront ............ A47L 9/2805

* cited by examiner

10,350,762 B2

AUTONOMOUSLY MOVING BODY, MOVEMENT CONTROLLING METHOD, AND RECORDING MEDIUM STORING MOVEMENT CONTROLLING PROGRAM

BACKGROUND

1. Technical Field

The present disclosure relates to an autonomously moving body which performs a predetermined task while autonomously moving, a movement controlling method of controlling movements of the autonomously moving body, and a recording medium storing a movement controlling program.

2. Description of the Related Art

There have been proposals on techniques related to cleaning robots which clean a room while autonomously moving (see, for example, Japanese Unexamined Patent Application Publication (Translation of PCT application) No. 2014-522231 (hereinafter referred to as Patent Document 1) and Japanese Unexamined Patent Application Publication No. 2013-248065 (hereinafter referred to as Patent Document 2).

Patent Document 1 discloses a technique for a cleaning robot to work while switching multiple modes depending on the necessity. In addition, Patent Document 2 discloses a technique for a cleaning robot to detect a direction in which the user is present and move in the detected direction.

SUMMARY

There has been a demand, however, for further technical improvements in the above-mentioned conventional techniques from the viewpoint of enhancing efficiency of accomplishing a task using multiple autonomous robots.

In one general aspect, the techniques disclosed here feature an autonomously moving body which performs a predetermined task while autonomously moving, including: a driver which makes the autonomously moving body move; a moving body detector which detects a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and a movement controller which controls the driver in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

The present disclosure makes it possible to accomplish a task efficiently by reducing spots where multiple autonomously moving bodies go through redundantly, and spots where none of the multiple autonomously moving bodies go through.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
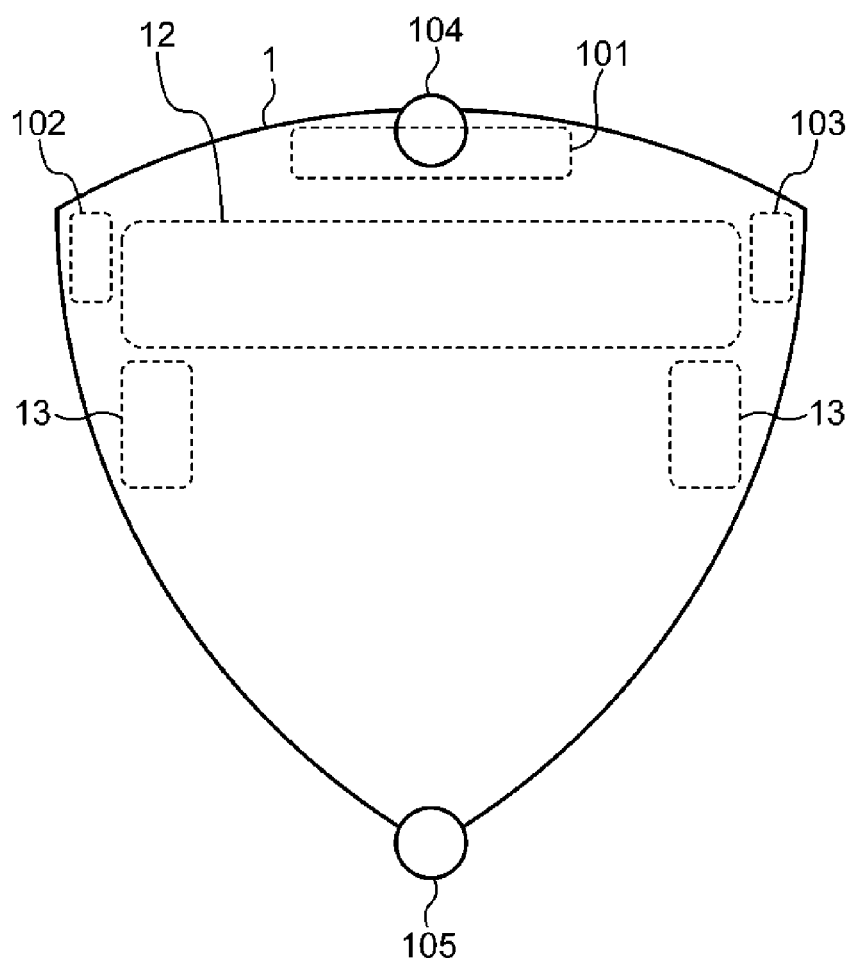
FIG. 1 is an overall view illustrating an example of a cleaning robot according to Embodiment 1.

DETAILED DESCRIPTION (Underlying Knowledge Forming Basis of the Present Disclosure)

Patent Document 1 given above discloses the technique for a cleaning robot to work while switching multiple modes depending on the necessity. More specifically, according to the technique disclosed in Patent Document 1, the multiple modes include: a spot processing mode in which the cleaning robot cleans mainly a spot; an obstacle-following mode in which the cleaning robot moves near an obstacle such as a wall; and a recoil mode in which the cleaning robot moves substantially in a direction away from the obstacle once the cleaning robot comes across the obstacle.

The technique disclosed in Patent Document 1 is related to a configuration for a single cleaning robot to work. Nevertheless, there is a case where multiple cleaning robots are put into operation in the same area such as a case where the area is too wide for a single cleaning robot to clean, and a case where the area needs to be cleaned in a time shorter than needed by a single cleaning robot. The simultaneous operation of multiple cleaning robots disclosed in Patent Document 1 in the same area causes a problem that efficient cleaning cannot be expected, for example, the multiple cleaning robots clean the same spot many times, or none of the multiple cleaning robots clean some spot, because each cleaning robot works independently.

For this reason, there is a need for a method of making the multiple cleaning robots work together to reduce spots cleaned redundantly and spots not cleaned at all.

Meanwhile, Patent Document 2 discloses the technique for a cleaning robot to move following the user. The cleaning robot following the user means that the cleaning robot is capable of moving to where the user exists. Patent Document 2, however, pays no attention to how to make multiple clearing robots work together to perform the task efficiently.

In view of the above, one non-limiting and exemplary embodiment of the present disclosure provides an autonomously moving body, a movement controlling method and a movement controlling program, with which multiple autonomously moving bodies perform a task while moving collaboratively, so that the multiple autonomously moving bodies can reduce spots where the multiple autonomously moving bodies go through redundantly or spots where none of the multiple autonomously moving bodies go through, and thereby accomplish the task efficiently.

To solve the above-described problem, an aspect of the present disclosure is an autonomously moving body which performs a predetermined task while autonomously moving, including: a driver which makes the autonomously moving body move; a moving body detector which detects a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and a movement controller which controls the driver in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

This configuration detects: the movement state indicating whether the different autonomously moving body existing in front of the autonomously moving body is moving along the obstacle; the direction in which the different autonomously moving body exists relative to the autonomously moving body; and the distance between the autonomously moving body and the different autonomously moving body. The configuration controls the driver which makes the autonomously moving body move in order for the autonomously moving body to move following the different autonomously moving body while keeping the position diagonally behind the different autonomously moving body at the opposite side of the different autonomously moving body from the obstacle, if the movement state indicates that the different autonomously moving body is moving along the obstacle.

Thus, the autonomously moving body moves following the different autonomously moving body moving along the obstacle, while keeping the position diagonally behind the different autonomously moving body at the opposite side of the different autonomously moving body from the obstacle. This makes it possible to reduce spots where the multiple autonomously moving bodies go through redundantly, or spots where none of the multiple autonomously moving bodies go through, and to perform the task efficiently.

Preferably, in the aspect of the present disclosure, while the autonomously moving body is moving following the different autonomously moving body, if the movement state of the different autonomously moving body becomes no longer the movement state indicating that the different autonomously moving body is moving along the obstacle, the movement controller controls the driver in order for the autonomously moving body to move straight ahead for a predetermined time.

While the autonomously moving body is moving following the different autonomously moving body, if the movement state of the different autonomously moving body becomes no longer the movement state indicating that the different autonomously moving body is moving along the obstacle, this configuration controls the driver in order for the autonomously moving body to move straight ahead for the predetermined time.

Thus, when the different autonomously moving body stops moving along the obstacle, the autonomously moving body following the different autonomously moving body having moved along the obstacle overtakes the different autonomously moving body, and thereafter starts to move along the obstacle. In turn, the different autonomously moving body moves following the autonomously moving body. This makes it possible to make the multiple autonomously moving bodies move more efficiently.

Preferably, in the aspect of the present disclosure, the autonomously moving further includes a front obstacle detector which detects the obstacle existing in front of the autonomously moving body; and a side obstacle detector which detects the obstacle existing beside a side surface of the autonomously moving body, in which the autonomously moving body moves along the obstacle as the different autonomously moving body, and while the autonomously moving body is moving along the obstacle as the different autonomously moving body, if the front obstacle detector detects the obstacle in front, the movement controller controls the driver in order for the autonomously moving body to turn until the side obstacle detector detects the obstacle beside the side surface, and thereafter to stop for a predetermined time.

This configuration detects the obstacle existing in front of the autonomously moving body, and detects the obstacle existing beside the side surface of the autonomously moving body. The configuration makes the autonomously moving body move along the obstacle as the different autonomously moving body. While the autonomously moving body is moving along the obstacle as the different autonomously moving body, if the configuration detects the obstacle in front of the autonomously moving body, the configuration controls the driver in order for the autonomously moving body to turn until the configuration detects the obstacle beside the side surface, and thereafter to stop for the predetermined time.

Thus, when the autonomously moving body stops moving along the obstacle, the different autonomously moving body having followed the autonomously moving body overtakes the autonomously moving body, and thereafter starts to move along the obstacle. In turn, the autonomously moving body moves following the different autonomously moving body. This makes it possible to make the multiple autonomously moving bodies move more efficiently.

Preferably, in the aspect of the present disclosure, the autonomously moving body further includes a side obstacle detector which detects the obstacle existing beside a side surface of the autonomously moving body, in which if the movement state indicates that the different autonomously moving body is moving along the obstacle, and concurrently the obstacle is detected beside the side surface on an opposite side from the different autonomously moving body, the movement controller controls the driver in order for the autonomously moving body not to move following the different autonomously moving body.

This configuration detects the obstacle existing beside the side surface of the autonomously moving body. If the movement state indicates that the different autonomously moving body is moving along the obstacle, and concurrently if the configuration detects the obstacle beside the side surface on the opposite side from the different autonomously moving body, this configuration controls the driver in order for the autonomously moving body not to move following the different autonomously moving body.

Thus, if the obstacle is detected beside the side surface on the opposite side from the different autonomously moving body, the autonomously moving body does not move following the different autonomously moving body. This makes it possible to prevent the multiple autonomously moving bodies from moving while next to each other in the full width, and accordingly to make the multiple autonomously moving bodies move without becoming an obstruction.

Preferably, in the aspect of the present disclosure, the autonomously moving body further includes a transmitter which is disposed in a rear portion of the autonomously moving body, and which, upon reception of the first signal sent from the different autonomously moving body, transmits a second signal indicating that the autonomously moving body is moving following the different autonomously moving body.

While the autonomously moving body is moving along the obstacle, this configuration sends from the rear portion of the autonomously moving body the first signal indicating that the autonomously moving body is moving along the obstacle. The configuration receives the second signal sent from the different autonomously moving body, and indicating that the different autonomously moving body is moving along the obstacle. Thereby, the configuration detects the movement state.

This makes it possible to easily detect the movement state of the different autonomously moving body moving in front of the autonomously moving body.

Furthermore, in the above autonomously moving body, the transmitter may send the first signal upon reception of the second signal sent from the different autonomously moving body.

Since this configuration sends the first signal upon reception of the second signal sent from the different autonomously moving body, the configuration is capable of making another autonomously moving body follow the autonomously moving body, and accordingly enables the multiple autonomously moving bodies to move abreast diagonally behind the different autonomously moving body. This makes it possible to perform the task more efficiently.

Preferably, in the aspect of the present disclosure, the autonomously moving body further includes a cleaner which cleans a floor. This configuration can clean a floor.

Another aspect of the present disclosure is a movement controlling method for an autonomously moving body which performs a predetermined task while autonomously moving, including detecting a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and controlling a driver which makes the autonomously moving body move, in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

This configuration detects: the movement state indicating whether the different autonomously moving body existing in front of the autonomously moving body is moving along the obstacle; the direction in which the different autonomously moving body exists relative to the autonomously moving body; and the distance between the autonomously moving body and the different autonomously moving body. The configuration controls the driver which makes the autonomously moving body move in order for the autonomously moving body to move following the different autonomously moving body while keeping a position diagonally behind the different autonomously moving body at the opposite side of the different autonomously moving body from the obstacle, if the movement state indicates that the different autonomously moving body is moving along the obstacle.

Thus, the autonomously moving body moves following the different autonomously moving body moving along the obstacle, while keeping a position diagonally behind the different autonomously moving body at the opposite side of the different autonomously moving body from the obstacle. This makes it possible to perform the task efficiently by reducing spots where the multiple autonomously moving bodies go through redundantly, or spots where none of the multiple autonomously moving bodies go through.

Another aspect of the present disclosure is a non-transitory computer-readable recording medium storing a movement controlling program for controlling movements of an autonomously moving body which performs a predetermined task while autonomously moving, the program executed by a computer included in the an autonomously moving body, and causing the computer to perform a method including: detecting a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and controlling a driver which makes the autonomously moving body move, in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

This configuration detects: the movement state indicating whether the different autonomously moving body existing in front of the autonomously moving body is moving along the obstacle; the direction in which the different autonomously moving body exists relative to the autonomously moving body; and the distance between the autonomously moving body and the different autonomously moving body. The configuration controls the driver which makes the autonomously moving body move in order for the autonomously moving body to move following the different autonomously moving body while keeping a position diagonally behind the different autonomously moving body at the opposite side of the different autonomously moving body from the obstacle, if the movement state indicates that the different autonomously moving body is moving along the obstacle.

Thus, the autonomously moving body moves following the different autonomously moving body moving along the obstacle, while keeping a position diagonally behind the different autonomously moving body at the opposite side of the different autonomously moving body from the obstacle. This makes it possible to perform the task efficiently by reducing spots where the multiple autonomously moving bodies go through redundantly, or spots where none of the multiple autonomously moving bodies go through.

It should be noted that all these aspects or specific aspects may be implemented using a system, a method, an integrated circuit, a computer program or a computer-readable recording medium such as a CD-ROM, or by arbitrarily combining them.

Embodiments will be hereinbelow described by referring to the drawings. Each of the below-described embodiments is one specific example of the present disclosure. Numerical values, shapes, materials, components, places in which to dispose the components, and the like provided in the following embodiments are examples, but not intended to limit the present disclosure. In addition, components included in the following embodiments but not recited in the independent claims defining the most generic concepts are described as optional components.

Embodiment 1

As for Embodiment 1, descriptions will be provided for a cleaning robot which vacuum-cleans while autonomously moving as an autonomously moving body.

FIG. 1 is an overall view illustrating an example of a cleaning robot according to Embodiment 1.

The cleaning robot 1 performs a predetermined task while autonomously moving. The predetermined task to be performed by the cleaning robot 1 is to clean a floor. As illustrated in FIG. 1, the cleaning robot 1 includes at least a cleaner 12, drivers 13, a front distance sensor 101, a left distance sensor 102, a right distance sensor 103, an image capturer 104 and a light emitter 105. The cleaning robot 1 includes a dust suction unit, a dust collection bin, a battery and the like in addition to the components illustrated in FIG. 1. Because, however, these have nothing to do with the movement control which will be described therein, descriptions for them are omitted.

The cleaner 12 cleans the floor. The cleaner 12 includes an opening which is opened in the bottom portion of the cleaning robot 1. The cleaner 12 suctions dust into the cleaning robot 1 by: suctioning dust using the duct suction unit; and sweeping out dust using brushes. The suctioned dust is collected into the dust collection bin.

The drivers 13 make the cleaning robot 1 moves. Each driver 13 includes a driving wheel which makes the cleaning robot 1 move, and a motor which drives the driving wheel. The driving wheel is installed in the bottom portion of the cleaning robot 1.

The front distance sensor 101 is an ultrasound sound sensor, for example. The front distance sensor 101 detects the distance between the front of the cleaning robot 1 and an obstacle such as a wall or an item of furniture. The front distance sensor 101 is mounted on the front portion the cleaning robot 1. The front distance sensor 101 detects an obstacle existing in front of the cleaning robot 1.

The left distance sensor 102 is an ultrasound sound sensor, for example. The left distance sensor 102 detects the distance between the left side surface of the cleaning robot 1 and an obstacle such as a wall or an item of furniture. The left distance sensor 102 is mounted on the left side surface of the cleaning robot 1. The left distance sensor 102 detects an obstacle existing beside the left surface of the cleaning robot 1.

The right distance sensor 103 is an ultrasound sound sensor, for example. The right distance sensor 103 detects the distance between the right side surface of the cleaning robot 1 and an obstacle such as a wall or an item of furniture. The right distance sensor 103 is mounted on the right side surface of the cleaning robot 1. The right distance sensor 103 detects an obstacle existing beside the right surface of the cleaning robot 1.

The image capturer 104 captures an image of the surroundings of the cleaning robot 1 in order to receive a light emission signal from a different cleaning robot. The image capturer 104 is mounted on the front portion of the cleaning robot 1, and has a wide angle of view in order to recognize the different cleaning robot at a wide angle.

Based on the captured image, the image capturer 104 detects: a movement state indicating whether the different cleaning robot existing in front of the cleaning robot 1 is moving along an obstacle; a direction in which the different cleaning robot exists relative to the cleaning robot 1; and a distance between the cleaning robot 1 and the different cleaning robot.

The light emitter 105 emits a light signal for the cleaning robot 1 to inform the different cleaning robot and the like how the cleaning robot 1 is running. The light emitter 105 is mounted on the rear portion of the cleaning robot 1, and emits light of low or no directivity in order to enable the different cleaning robot to recognize the light signal at a wide angle.

Figure 2:
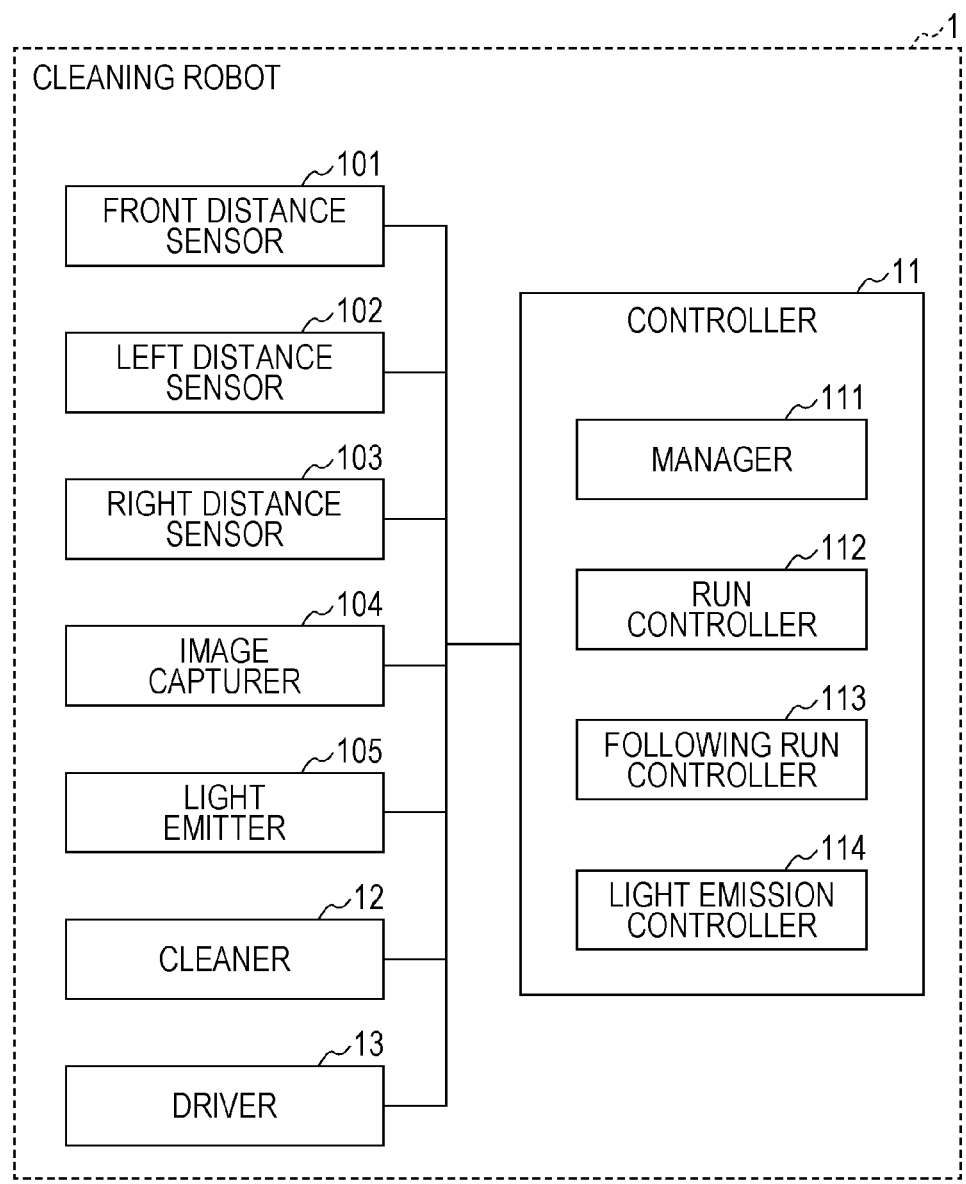
FIG. 2 is a block diagram illustrating an example of a functional configuration of the cleaning robot according to Embodiment 1.

FIG. 2 is a block diagram illustrating an example of a functional configuration of the cleaning robot according to Embodiment 1.

As illustrated in FIG. 2, the cleaning robot 1 includes at least a controller 11, the cleaner 12, the drivers 13, the front distance sensor 101, the left distance sensor 102, the right distance sensor 103, the image capturer 104 and the light emitter 105.

Since the cleaner 12, the drivers 13, the front distance sensor 101, the left distance sensor 102, the right distance sensor 103, the image capturer 104 and the light emitter 105 have been discussed using the overall view in FIG. 1, descriptions for them are omitted herein.

The controller 11 is a central processing unit (CPU), for example. The controller 11 controls the movements of the cleaning robot 1. The controller 11 includes a manager 111, a run controller 112, a following run controller 113, and a light emission controller 114.

Based on sensing data obtained from the front distance sensor 101, the left distance sensor 102, the right distance sensor 103 and the image capturer 104, the manager 111 manages run modes of the cleaning robot 1. Incidentally, the run modes include: a random run mode in which the cleaning robot 1 runs randomly; a wall-side run mode in which the cleaning robot 1 runs along a wall; and a following run mode in which the cleaning robot 1 runs following diagonally behind a different cleaning robot running along a wall. Furthermore, while in the wall-side run mode, the cleaning robot 1 not only runs along a wall, but also runs along an obstacle such as an item of furniture or a home electric appliance. In addition, the run modes are not limited to the above-mentioned three run modes, and may include other run modes.

Based on the sensing data obtained from the front distance sensor 101, the left distance sensor 102, the right distance sensor 103 and the image capturer 104, the run controller 112 controls the drivers 13 in order to make the cleaning robot 1 run either in the random run mode or in the wall-side run mode.

Based on the sensing data obtained from the front distance sensor 101, the left distance sensor 102, the right distance sensor 103 and the image capturer 104, the following run controller 113 controls the drivers 13 in order to make the cleaning robot 1 run in the following run mode in which the cleaning robot 1 runs following a different robot moving near in front of the cleaning robot 1.

In a case where the movement state is a movement state indicating that the different cleaning robot is moving along an obstacle, the following run controller 113 controls the drivers 13 in order to make the cleaning robot 1 move following the different cleaning robot while keeping a position diagonally behind the different cleaning robot at the opposite side of the different cleaning robot from the obstacle.

The light emission controller 114 controls the light emission by the light emitter 105 in order to make the light emitter 105 send a light emission signal depending on how the cleaning robot 1 is running. The light emitter 105 is mounted on the rear portion the cleaning robot 1. While the cleaning robot is moving along an obstacle, the light emitter 105 sends a signal indicating that the cleaning robot is moving along the obstacle. The image capturer 104 detects the movement state of the different cleaning robot by receiving a signal sent from the different cleaning robot and indicating that the different cleaning robot is moving along the obstacle. When the image capturer 104 receives the signal sent from the different cleaning robot and indicating that the different cleaning robot is moving along the obstacle, the light emitter 105 sends a signal indicating that the cleaning robot is moving along the obstacle.

It should be noted that: in Embodiment 1, the driver 13 is an example of a driver; the image capturer 104 is an example of a moving body detector; the run controller 112 and the following run controller 113 are an example of a movement controller; the front distance sensor 101 is an example of a front obstacle detector; the left distance sensor 102 and the right distance sensor 103 are an example of a side obstacle detector; the light emitter 105 is an example of a transmitter; and the cleaner 12 is an example of a cleaner.

Figure 3:
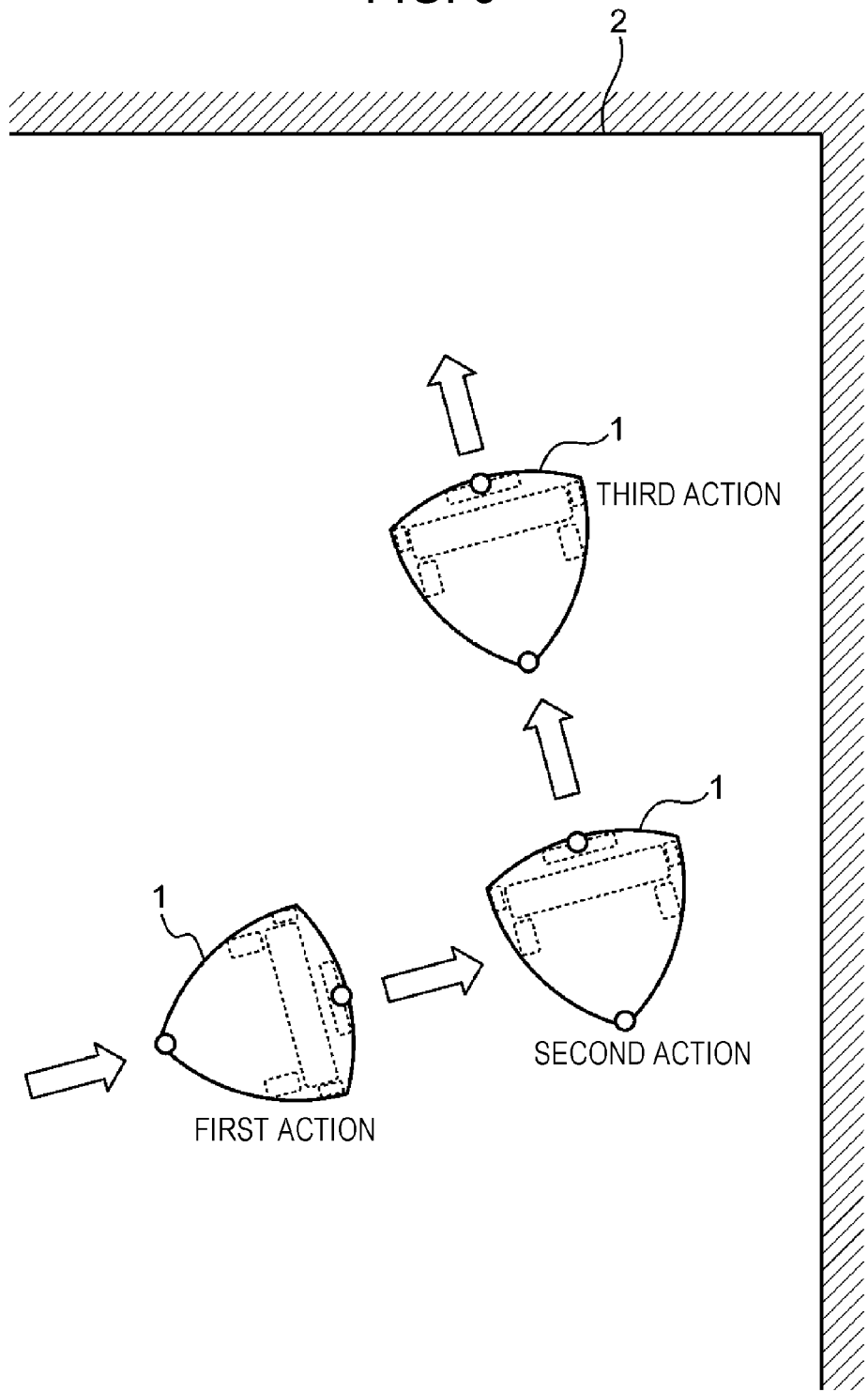
FIG. 3 is a diagram for explaining an example of how the cleaning robot runs in a random run mode in Embodiment 1.

Here, using FIG. 3, descriptions will be provided for an example of how the cleaning robot 1 runs in the random run mode.

FIG. 3 is a diagram for explaining an example of how the cleaning robot runs in a random run mode in Embodiment 1.

In FIG. 3, a wall 2 is a wall of a room which is a two-dimensional area where the cleaning robot 1 performs the cleaning task. The cleaning robot 1 moves straight ahead for a randomly-determined predetermined time while vacuuming the floor (a first action). After the predetermined time passes, the cleaning robot 1 stops, and turns in place at a randomly-determined angle (a second action). Next, the cleaning robot 1 moves straight ahead for the randomly-determined predetermined time (a third action). The cleaning robot 1 vacuums all the area randomly by repeating the first to third actions.

Figure 4:
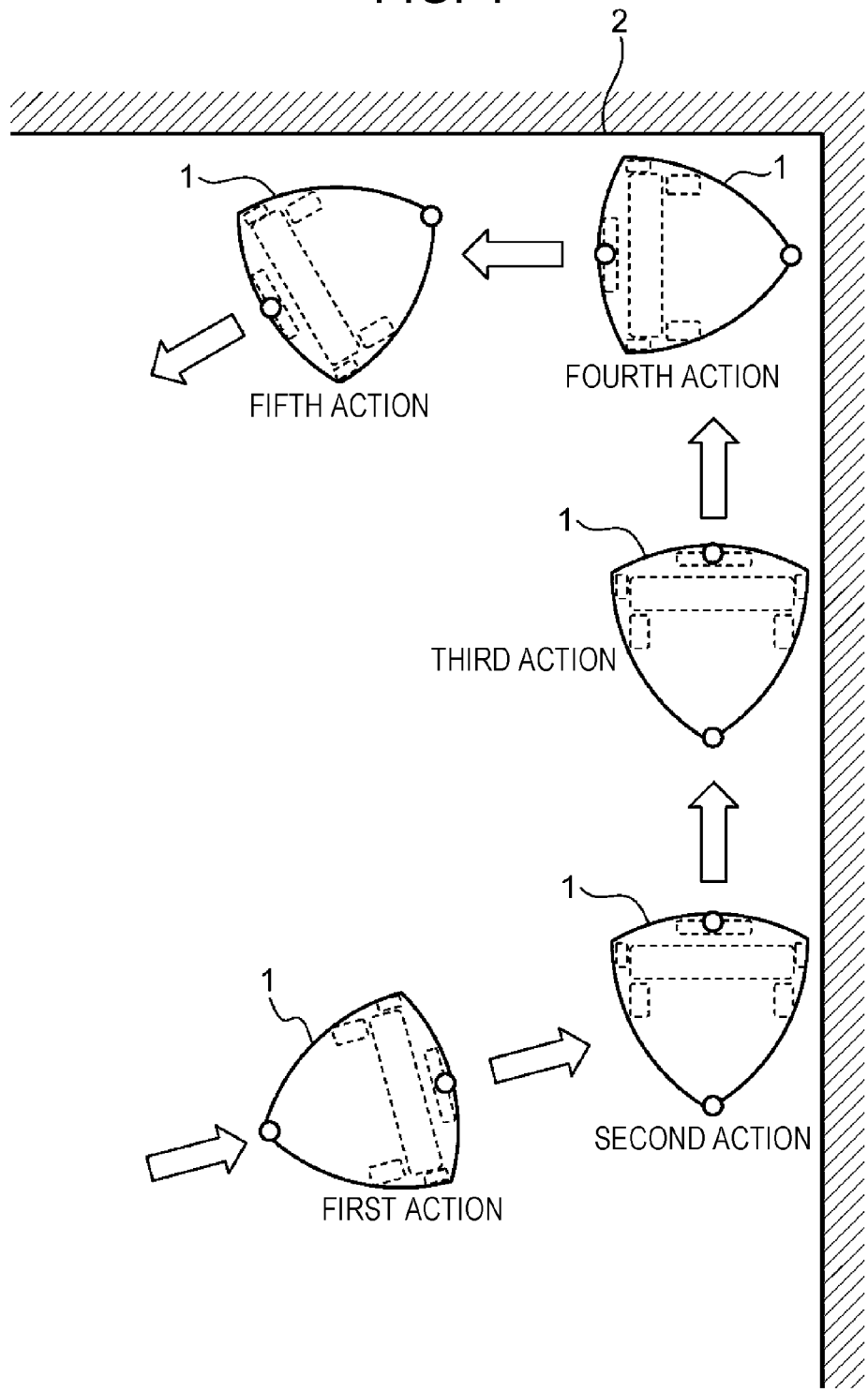
FIG. 4 is a diagram for explaining an example of how the cleaning robot runs in a wall-side run mode in Embodiment 1.

Next, using FIG. 4, descriptions will be provided for an example of how the cleaning robot 1 runs in the wall-side run mode.

FIG. 4 is a diagram for explaining an example of how the cleaning robot runs in a wall-side run mode in Embodiment 1.

In FIG. 4, in a case where the distance to a wall from the cleaning robot 1 at a run becomes shorter than a predetermined distance, the cleaning robot 1 enters into the wall-side run mode. The cleaning robot 1 moves straight ahead for the randomly-determined predetermined time while vacuuming the floor (a first action). Subsequently, in the case where the distance to the wall from the cleaning robot 1 becomes shorter than another predetermined distance, the cleaning robot 1 stops and turns in place at such an angle that the side wall of the cleaning robot 1 becomes parallel with the wall surface of the wall 2 (a second action). Thereafter, the cleaning robot 1 moves straight ahead while keeping the side surface of the cleaning robot 1 parallel with the wall surface of the wall 2 (a third action). After that, in a case where the distance to the wall from the front of the cleaning robot 1 becomes shorter than the predetermined distance, the cleaning robot 1 turns in place at a right angle (a fourth action). Next, the cleaning robot 1 enters into the wall-side run mode. After a randomly-determined predetermined time has passed since the cleaning robot 1 enters into the wall-side run mode, the cleaning robot 1 stops and turns in place at the randomly-determined angle, and then enters into the random run mode (a fifth action). The repetition of the first-to-fifth actions makes it possible for the cleaning robot 1 to run along the wall 2. Thereby, the cleaning robot 1 efficiently vacuums the wall-side parts in the intended area.

Next, using FIGS. 5 and 6, descriptions will be provided for an example of how the cleaning robot 1 runs in the following run mode.

Figure 5:
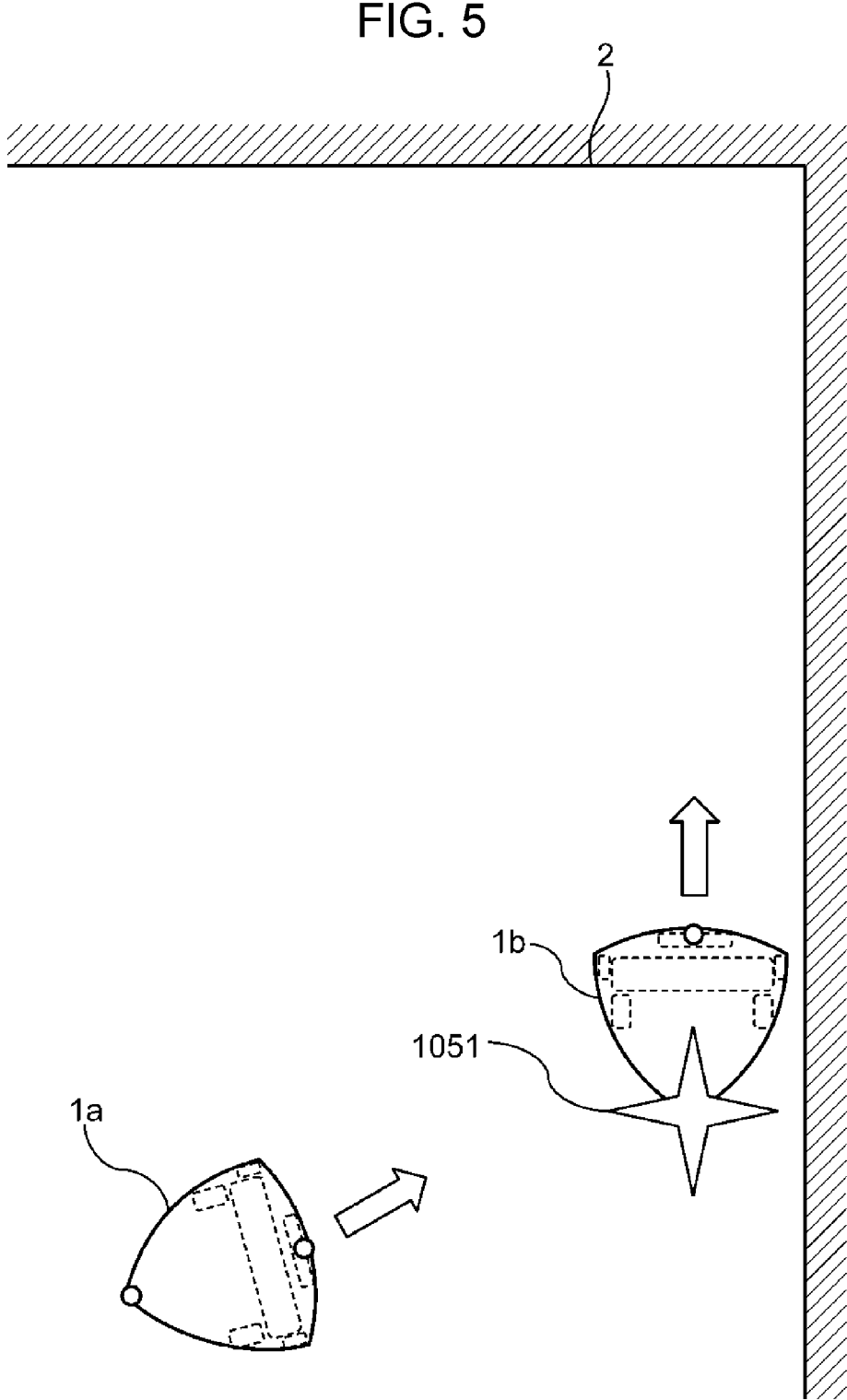
FIG. 5 is a diagram for explaining how the cleaning robot acts to enter into a following run mode from the random run mode in Embodiment 1.
Figure 6:
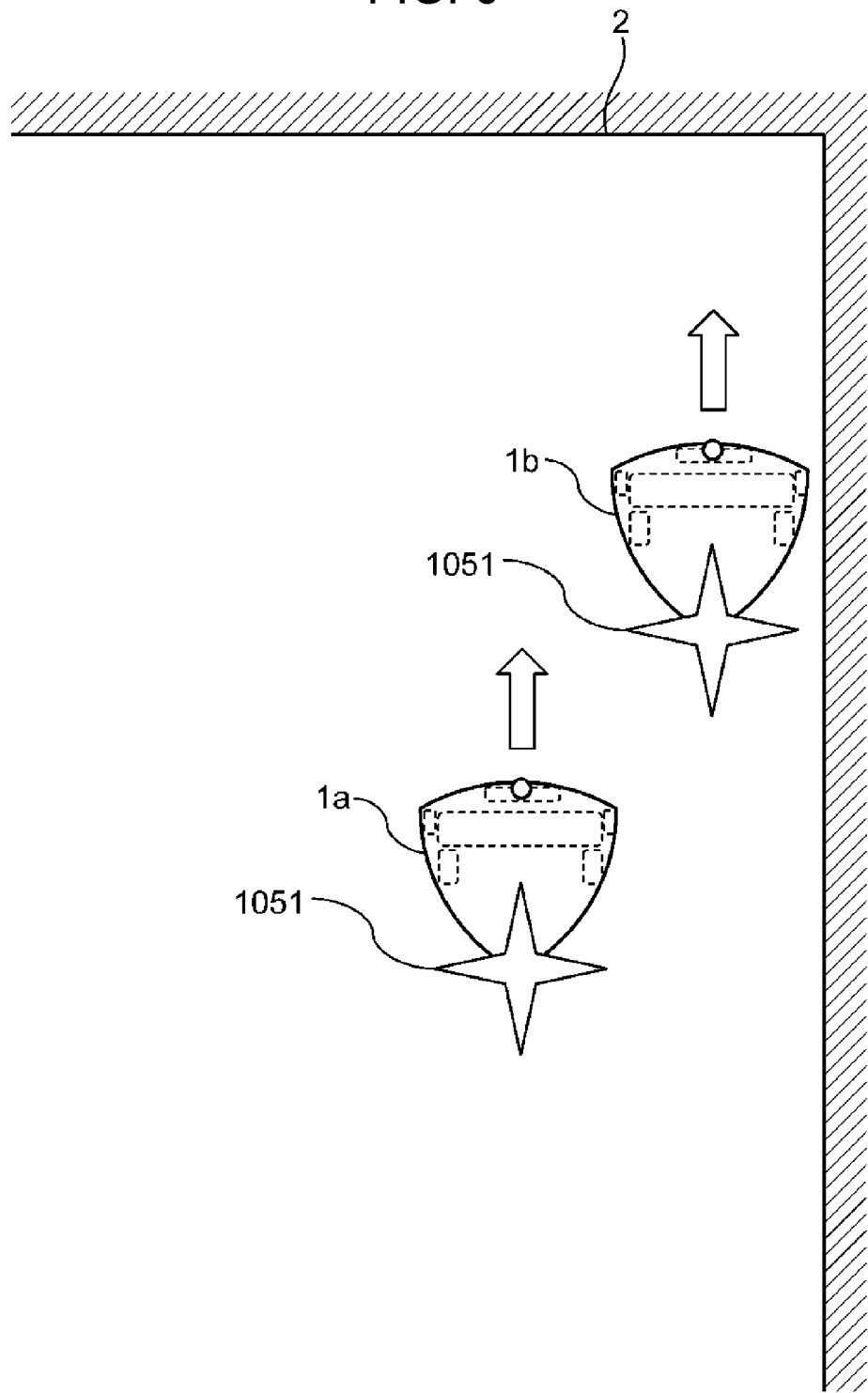
FIG. 6 is a diagram for explaining an example of how the cleaning robot runs in the following run mode in Embodiment 1.

FIG. 5 is a diagram for explaining how the cleaning robot acts to enter into a following run mode from the random run mode in Embodiment 1 and FIG. 6 is a diagram for explaining an example of how the cleaning robot runs in the following run mode in Embodiment 1. Incidentally, the following descriptions will be provided by referring to a cleaning robot entering into the following run mode from the random run mode as a first cleaning robot 1a, and a cleaning robot running in the wall-side run mode as a second cleaning robot 1b. The first and second cleaning robots 1a and 1b have the same configuration as the cleaning robot 1.

In FIG. 5, the second cleaning robot 1b running in the wall-side run mode sends a wall-side run signal 1051 indicating that the second cleaning robot 1b is running along the wall 2. Upon reception of the wall-side run signal 1051 sent from the second cleaning robot 1b, the first cleaning robot 1a running in the random run mode enters into the following run mode from the random run mode, and starts to run in the following run mode. In the following run mode, the first cleaning robot 1a moves following the second cleaning robot 1b while keeping the a position diagonally behind the second cleaning robot 1b at an opposite side of the second cleaning robot 1b from the wall 2.

In FIG. 6, the first cleaning robot 1a running in the following run mode continues running in the position at the opposite side of the second cleaning robot 1b from the wall 2, and diagonally behind the second cleaning robot 1b, while receiving, as a guide, the wall-side run signal 1051 sent from the second cleaning robot 1b running in the wall-side run mode. While doing so, the first cleaning robot 1a also sends the wall-side run signal 1051. This makes it possible for another cleaning robot to run in the following run mode to follow the first cleaning robot 1a. Thereby, the multiple cleaning robots are capable of running together diagonally behind the second cleaning robot 1b.

Figure 7:
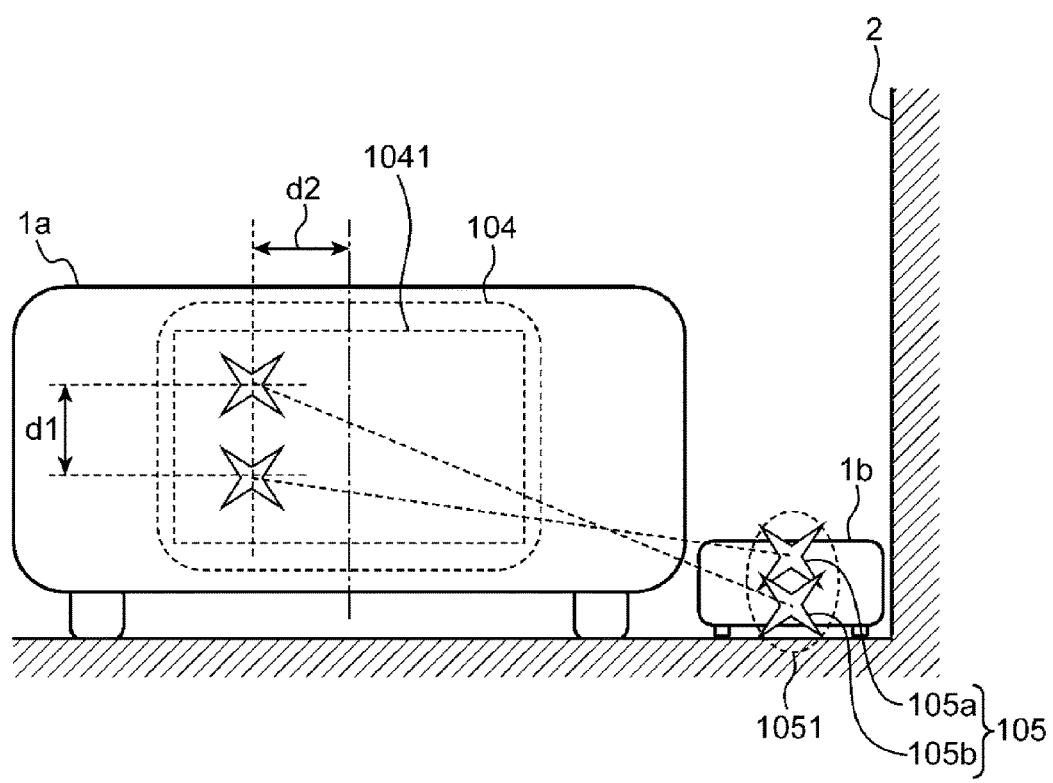
FIG. 7 is a schematic diagram for explaining an example of how a first cleaning robot runs following a second cleaning robot in Embodiment 1.

FIG. 7 is a schematic diagram for explaining an example of how a first cleaning robot runs following a second cleaning robot in Embodiment 1.

In FIG. 7, the light emitter 105 of the second cleaning robot 1b running in the wall-side run mode includes a first light emitting device 105a and a second emitting device 105b which are arranged side by side in a height direction with a predetermined space in between. The first and second light emitting devices 105a and 105b each emit the wall-side run signal 1051 backward indicating that the second cleaning robot 1b is running in the wall-side run mode.

The image capturer 104 of the first cleaning robot 1a entering into the following run mode or running in the following run mode receives the wall-side run signal 1051 from the second cleaning robot 1b. The image capturer 104 includes an image capturing device 1041. The image capturer 104 measures the distance from the first cleaning robot 1a to the second cleaning robot 1b based on an interval d1 between two images of the respective wall-side run signals 1051 of the second cleaning robot 1b which are formed on the image capturing device 1041. In other words, the image capturer 104 calculates the distance from the interval d1 between the two images using a table or mathematical function in which the interval d1 and a distance from the first cleaning robot 1a to the second cleaning robot 1b are associated with each other.

Moreover, the image capturer 104 measures an angle between a straight line joining the first and second cleaning robots 1a and 1b and a straight line extending in a direction of progress of the second cleaning robot 1b, based on an amount of horizontal-direction displacement d2 between the center of the image capturing device 1041 and the two images of the respective wall-side run signals 1051 (the midpoint of the straight line joining the two images). In other words, the image capturer 104 calculates the angle from the amount of horizontal-direction displacement d2 between the center of the image capturing device 1041 and the two images using a table or mathematical function in which the horizontal-direction displacement amount d2, and the angle between the straight line joining the first and second cleaning robots 1a and 1b and the straight line extending in the direction of progress of the second cleaning robot 1b are associated with each other. Based on the calculated angle, the first cleaning robot 1a is capable of identifying the direction in which the second cleaning robot 1b exists relative to the first cleaning robot 1a. The calculation of the distance from the first cleaning robot 1a to the second cleaning robot 1b and the angle makes it possible for the first cleaning robot 1a to run at the opposite side of the second cleaning robot 1b from the wall 2, and following diagonally behind the second cleaning robot 1b. For example, the following run controller 113 makes the first cleaning robot 1a run following diagonally behind the second cleaning robot 1b while keeping the interval d1 and the displacement amount d2 at the respective predetermined lengths.

Embodiment 1 has discussed the following run method using the two light emitting devices and the image capturing device. Nevertheless, in Embodiment 1, a different following run method may be employed in which: the first cleaning robot 1a includes two light receivers arranged side by side in the left-right direction with a predetermined interval in between; and the first cleaning robot 1a measures the distance and the angle by stereographic vision using the two light receivers.

Using FIGS. 8 to 11, descriptions will be provided for the basic movement action, random run mode action, wall-side run mode action, and following run mode action of the above-configured cleaning robot 1 of Embodiment 1.

Figure 8:
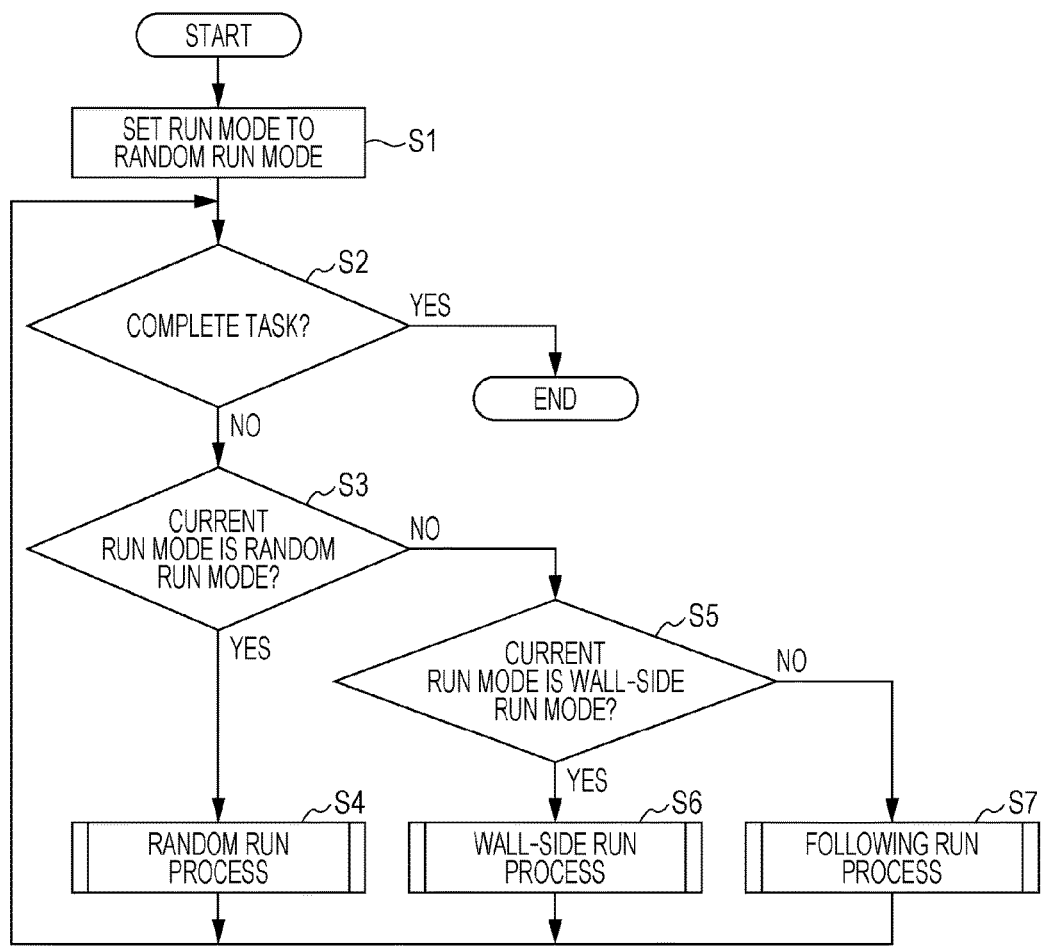
FIG. 8 is a flowchart illustrating an example of a basic movement action to be performed by the cleaning robot in Embodiment 1.

FIG. 8 is a flowchart illustrating an example of a basic movement action to be performed by the cleaning robot in Embodiment 1.

To begin with, at step S1, the manager 111 sets the run mode to the random run mode.

Next, in step S2, the manager 111 determines whether the task has been completed, based on whether a predetermined task time has passed. Incidentally, the task to be performed by the cleaning robot 1 is to clean the floor. In addition, whether the task has been completed may be made based on whether the amount of electricity remaining in the battery included in the first cleaning robot 1b is equal to or less than a predetermined value, instead of whether the predetermined task time has passed. In this respect, if it is determined that the task has been completed (Yes in step S2), the manager 111 terminates the basic movement action.

On the other hand, if it is not determined that the task has been completed (No in step S2), the manager 111 determines in step S3 whether the current run mode is the random run mode. In this respect, if it is determined that the current run mode is the random run mode (Yes in step S3), the run controller 112 performs a random run process in step S4 for making the cleaning robot 1 run in the random run mode. Incidentally, the random run process will be described later using FIG. 9. After the random run process is performed, the process flow returns to step S2.

On the other hand, if it is not determined that the current run mode is the random run mode (No in step S3), the manager 111 determines in step S5 whether the current run mode is the wall-side run mode. In this respect, if it is determined that the current run mode is the wall-side run mode (Yes in step S5), the run controller 112 performs a wall-side run process in step S6 for making the cleaning robot 1 run in the wall-side run mode. Incidentally, the wall-side run process will be described later using FIG. 10. After the wall-side run process is performed, the process flow returns to step S2.

On the other hand, if it is not determined that the current run mode is the wall-side run mode (No in step S5), the following run controller 113 performs a following run process in step S7 for making the cleaning robot 1 run in the following run mode. Incidentally, the following run process will be described later using FIG. 11. After the following run process is performed, the process flow returns to step S2.

Figure 9:
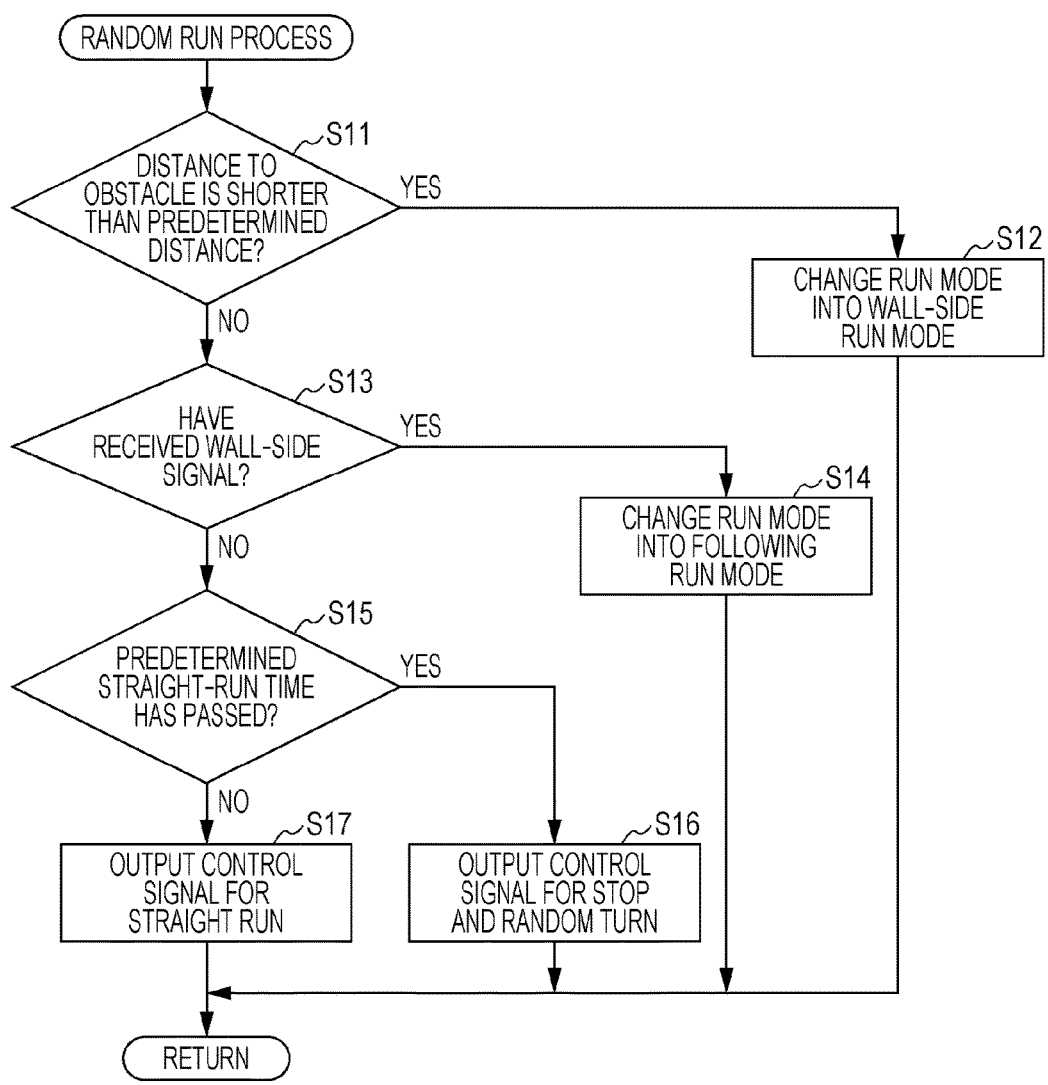
FIG. 9 is a flowchart illustrating an example of a random run process to be performed by the cleaning robot in Embodiment 1.

FIG. 9 is a flowchart illustrating an example of a random run process to be performed by the cleaning robot in Embodiment 1.

To begin with, in step S11, based on sensor data from the front distance sensor 101, the left distance sensor 102 and the right distance sensor 103, the run controller 112 determines whether the distance to an obstacle (for example, a wall) from the cleaning robot 1 becomes shorter than the predetermined distance. In this respect, if it is determined that the distance to the obstacle from the cleaning robot 1 becomes shorter than the predetermined distance (Yes in step S11), the run controller 112 changes the run mode into the wall-side run mode in step S12.

On the other hand, if it is not determined that the distance to the obstacle from the cleaning robot 1 becomes shorter than the predetermined distance (No in step S11), the run controller 112 determines in step S13 whether a wall-side run signal has been received from a different cleaning robot. In this respect, if it is determined that a wall-side run signal has been received (Yes in step S13), the run controller 112 changes the run mode into the following run mode in step S14.

On the other hand, if it is determined that no wall-side run signal has been received (No in step S13), the run controller 112 determines in step S15 whether a randomly-determined predetermined straight-run time has passed since the cleaning robot 1 starts run straight. In this respect, if it is determined that the predetermined straight-run time has passed (Yes in step S15), the run controller 112 stops the cleaning robot 1, and outputs a control signal for making the cleaning robot 1 turn at a randomly-determined angle to the drivers 13. Upon reception of the control signal, the drivers 13 make the cleaning robot 1 turn at the randomly-determined angle.

On the other hand, if it is not determined that the predetermined straight-run time has passed (No in step S15), the run controller 112 outputs a control signal for making the cleaning robot 1 run straight to the drivers 13 in step S17. Upon reception of the control signal, the drivers 13 make the cleaning robot 1 run straight.

As discussed above, in the random run mode, the cleaning robot 1 repeats the action of: running straight ahead until the randomly-determined straight-run time has passed; and thereafter, turning at the randomly-determined angle.

Figure 10:
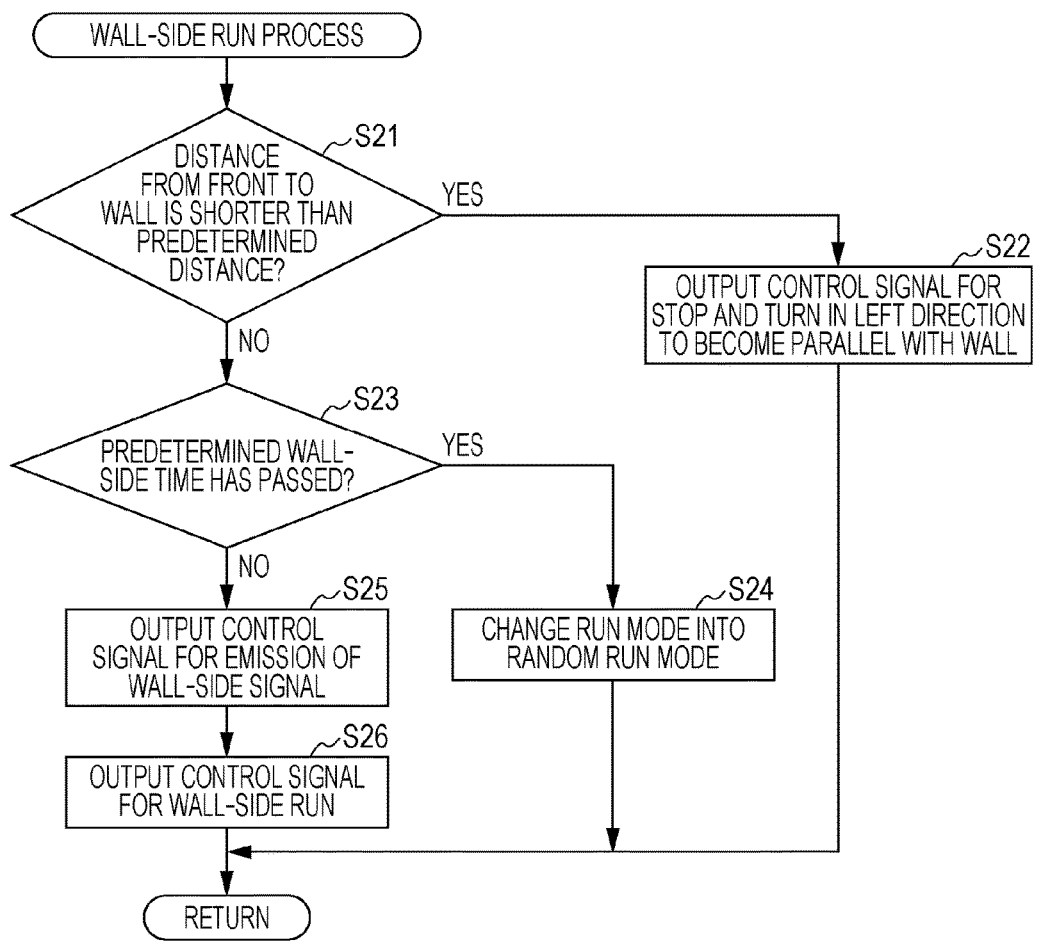
FIG. 10 is a flowchart illustrating an example of a wall-side run process to be performed by the cleaning robot in Embodiment 1.

FIG. 10 is a flowchart illustrating an example of a wall-side run process to be performed by the cleaning robot in Embodiment 1.

To begin with, based on sensor data from the front distance sensor 101, the run controller 112 determines in step S21 whether the distance to a wall from the front of the cleaning robot 1 becomes shorter than the predetermined distance. In this respect, if it is determined that the distance to the wall from the front of the cleaning robot 1 becomes shorter than the predetermined distance (Yes in step S21), the run controller 112, in step S22, stops the cleaning robot 1, and outputs to the drivers 13 a control signal for making the cleaning robot 1 turn in the left direction until the distance between the right side surface of the cleaning robot 1 and the wall becomes equal to a predetermined distance (until the right side surface of the cleaning robot 1 becomes parallel with the wall) based on sensor data from the right distance sensor 103. Upon reception of the control signal, the drivers 13 make the cleaning robot 1 turn in the left direction until the right side surface of the cleaning robot 1 becomes parallel with the wall.

On the other hand, if it is not determined that the distance to the wall from the front of the cleaning robot 1 becomes shorter than the predetermined distance (No in step S21), the run controller 112 determines in step S23 whether a randomly-determined predetermined wall-side run time has passed since the cleaning robot 1 starts to run along the wall. In this respect, if it is determined that the predetermined wall-side run time has passed (Yes in step S23), the run controller 112 changes the run mode into the random run mode in step S24.

On the other hand, if it is not determined that the predetermined wall-side run time has passed (No in step S23), the light emission controller 114 outputs a control signal for making the light emitter 105 emit a wall-side run signal to the light emitter 105 in step S25. Upon reception of the control signal, the light emitter 105 emits the wall-side run signal.

Next, in step S26, based on sensor data from the right distance sensor 103, the run controller 112 outputs to the drivers 13 a control signal for making the cleaning robot 1 run straight ahead (run along the wall) while keeping the predetermined distance between the right side surface of the cleaning robot 1 and the wall. Upon reception of the control signal, the drivers 13 make the cleaning robot 1 run straight ahead along the wall.

As discussed above, in the wall-side run mode, the cleaning robot 1 repeats the action of: running along the wall until the randomly-determined wall-side run time has passed; and thereafter, changing from the wall-side run mode into the random run mode. In addition, while the cleaning robot 1 is running along the wall, the cleaning robot 1 is emitting the wall-side run signal. This makes it possible to make a different cleaning robot receiving the wall-side run signal run following the cleaning robot 1.

In this embodiment, once the distance to the wall from the front of the cleaning robot 1 becomes shorter than the predetermined distance, the cleaning robot 1 is made to turn in the left direction, and to run straight ahead while keeping the distance between the right side surface of the cleaning robot 1 and the wall at the predetermined distance. Nevertheless, the present disclosure is not limited to this in particular. The cleaning robot 1 may be configured to turn in the right direction, and thereafter to run straight ahead while keeping the predetermined distance between the left side surface of the cleaning robot 1 and the wall once the distance to the wall from the front of the cleaning robot 1 becomes shorter than the predetermined distance.

Figure 11:
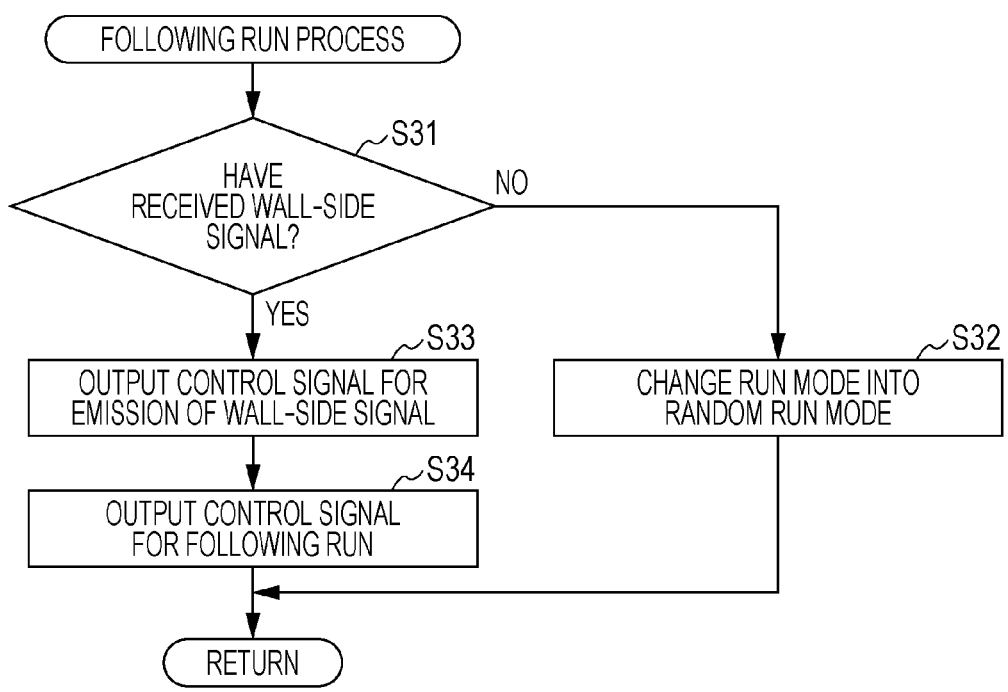
FIG. 11 is a flowchart illustrating an example of a following run process to be performed by the cleaning robot in Embodiment 1.

FIG. 11 is a flowchart illustrating an example of a following run process to be performed by the cleaning robot in Embodiment 1.

To begin with, in step S31, the following run controller 113 determines whether a wall-side run signal is received from a different cleaning robot. In this respect, if it is determined that no wall-side run signal is received (No in step S31), the following run controller 113 changes the run mode into the random run mode in step S32.

On the other hand, if it is determined that a wall-side run signal is received (Yes in step S31), the light emission controller 114 outputs to the light emitter 105 a control signal for making the light emitter 105 emit a wall-side run signal in step S33. Upon reception of the control signal, the light emitter 105 emits the wall-side run signal.

Next, in step S34, the following run controller 113 outputs to the drivers 13 a control signal for making the cleaning robot 1 run following diagonally behind the different cleaning robot running before the cleaning robot 1 while keeping the cleaning robot 1 at a predetermined distance from the different cleaning robot. Upon reception of the control signal, the drivers 13 make the cleaning robot 1 run following diagonally behind the different cleaning robot while keeping the predetermined distance.

As discussed above, in the following run mode, the cleaning robot 1 runs following diagonally behind the different cleaning robot running along a wall. This makes it possible to reduce spots where the multiple cleaning robots go through redundantly, and spots where none of the multiple cleaning robots go through. Accordingly, the task can be accomplished efficiently.

Embodiment 2

Embodiment 1 has discussed the example where the first cleaning robot runs following diagonally behind the second cleaning robot running along an obstacle. Embodiment 2 will describe how the first and second cleaning robots act when the second cleaning robot running along an obstacle comes close to an obstacle such as a wall.

Figure 12:
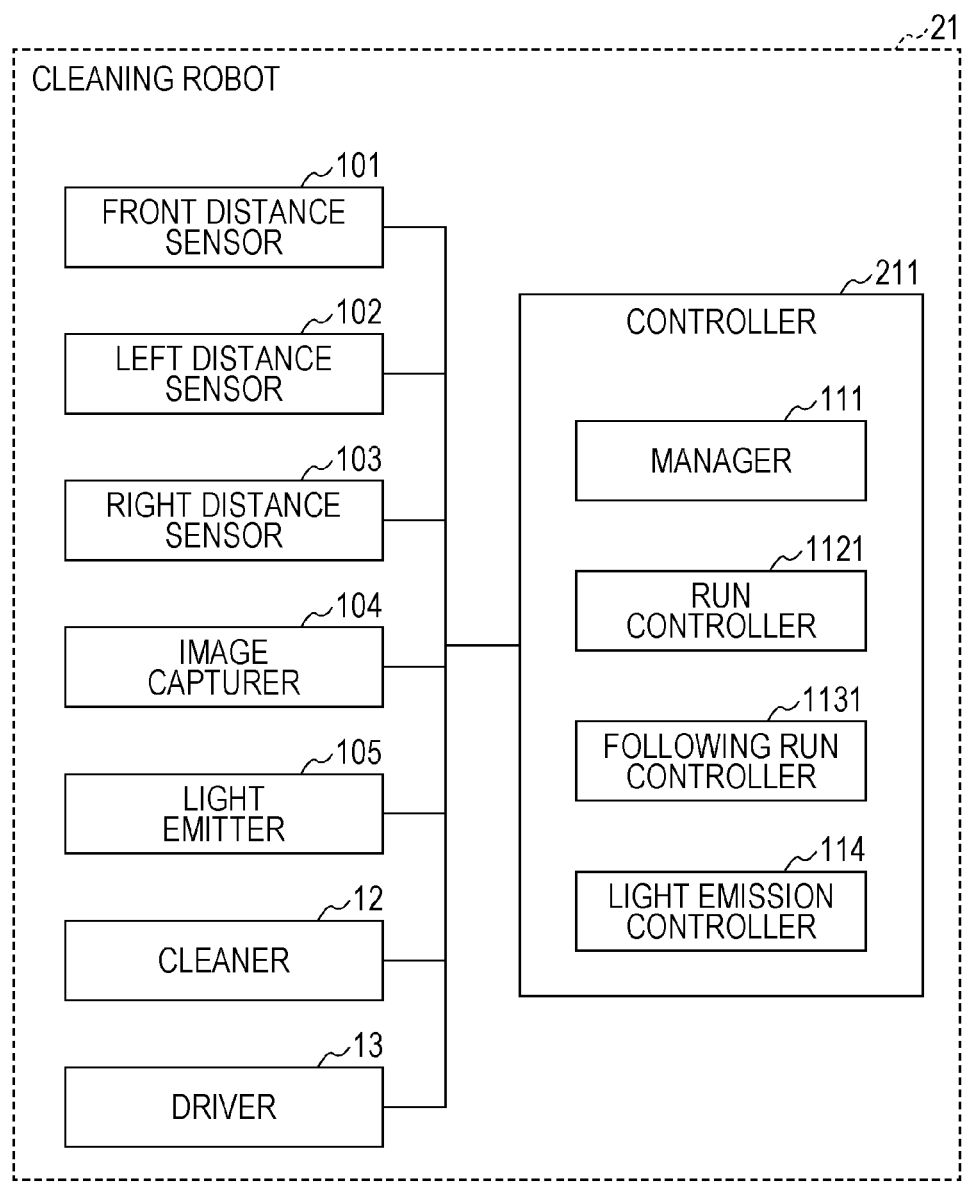
FIG. 12 is a block diagram illustrating an example of a functional configuration of a cleaning robot according to Embodiment 2.

FIG. 12 is a block diagram illustrating an example of a functional configuration of a cleaning robot according to Embodiment 2. Incidentally, in Embodiment 2, components which are the same as those in the cleaning robot 1 of Embodiment 1 are denoted by the same reference signs, and descriptions for such components are omitted.

A cleaning robot 21 illustrated in FIG. 12 includes at least a controller 211, the cleaner 12, the drivers 13, the front distance sensor 101, the left distance sensor 102, the right distance sensor 103, the image capturer 104 and the light emitter 105.

The controller 211 is a CPU, for example. The controller 211 controls the movements of the cleaning robot 21. The controller 211 includes the manager 111, a run controller 1121, a following run controller 1131, and the light emission controller 114.

While as a different cleaning robot, the cleaning robot 21 is moving along an obstacle, in a case where the front distance sensor 101 detects the obstacle in front of the cleaning robot 21, the run controller 1121 controls the drivers 13 in order for the cleaning robot 21 to turn until the right distance sensor 103 detects the obstacle beside the side surface of the cleaning robot 21, and to thereafter stops for a predetermined time.

While the cleaning robot 21 is moving following the different cleaning robot, in a case where the movement state of the different cleaning robot becomes no longer the movement state indicating that the different cleaning robot is moving along the obstacle, the following run controller 1131 controls the drivers 13 in order for the cleaning robot 21 to run straight ahead for the predetermined time.

Next, using FIGS. 13 and 14, descriptions will be provided for how the first and second cleaning robots each act in a case where the front of the second cleaning robot running in the wall-side run mode comes close to a wall while the first cleaning robot in the following run mode is following the second cleaning robot.

Figure 13:
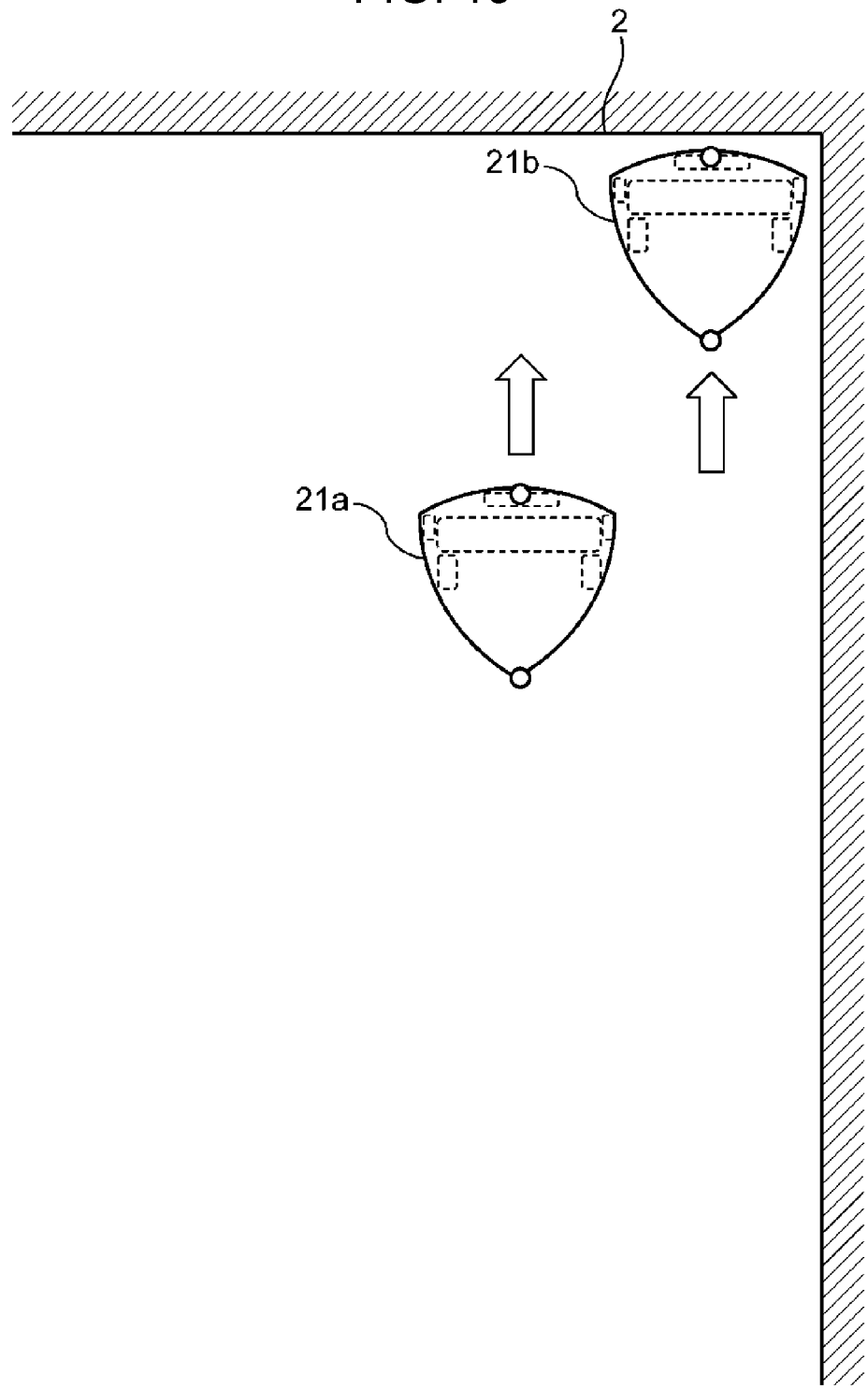
FIG. 13 is a diagram for explaining an example of how a front of a second cleaning robot followed by a first cleaning robot comes close to a wall in Embodiment 2.
Figure 14:
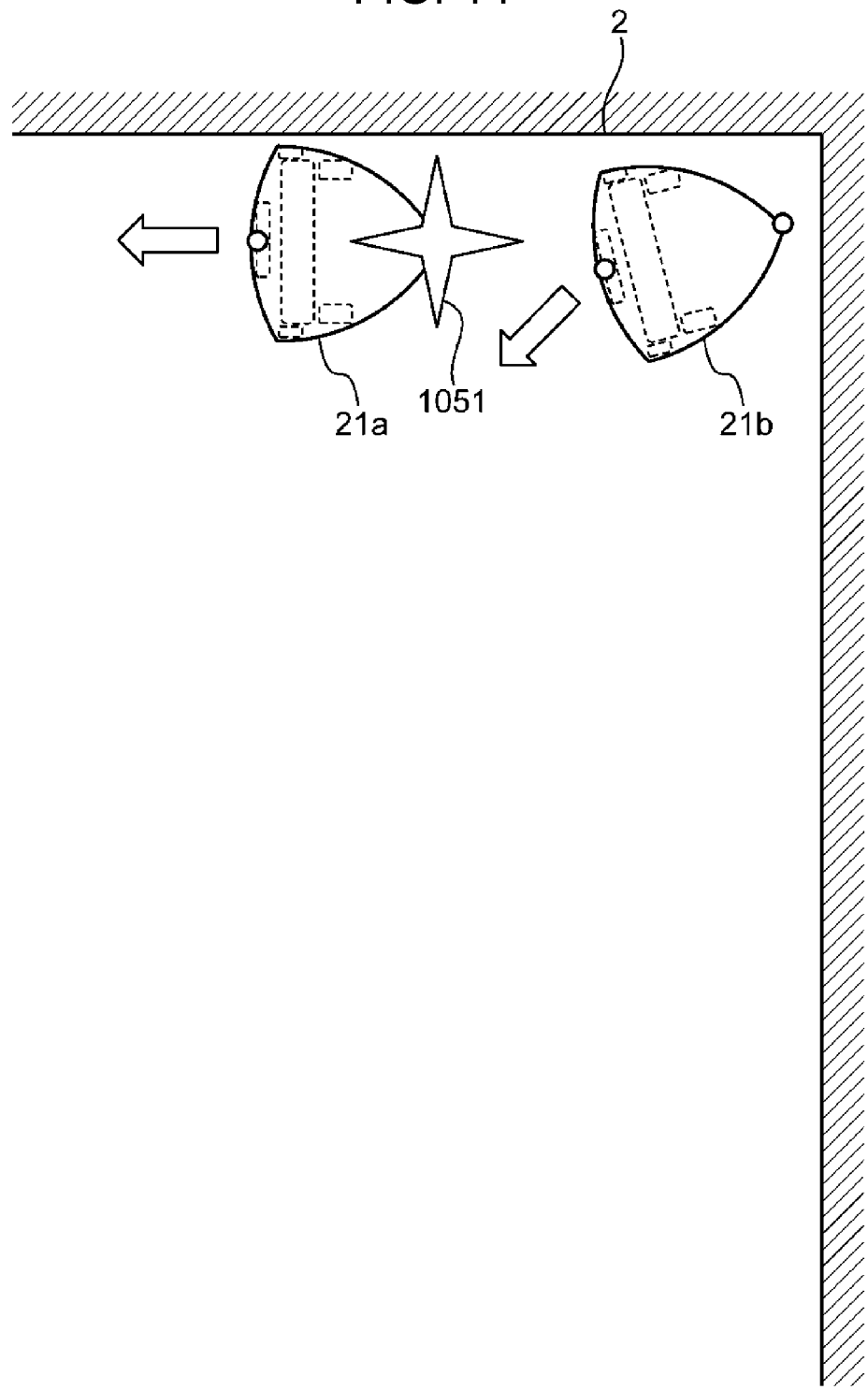
FIG. 14 is a diagram for explaining an example of how run modes of the first and second cleaning robots are switched after a predetermined time has passed since the front of the second cleaning robot followed by the first cleaning robot comes close to the wall in Embodiment 2.

FIG. 13 is a diagram for explaining an example of how a front of a second cleaning robot followed by a first cleaning robot comes close to a wall in Embodiment 2, and FIG. 14 is a diagram for explaining an example of how run modes of the first and second cleaning robots are switched after a predetermined time has passed since the front of the second cleaning robot followed by the first cleaning robot comes close to the wall in Embodiment 2.

In FIG. 13, in the case where the distance to the wall 2 from the front of the second cleaning robot 21*b* becomes shorter than the predetermined distance, the second cleaning robot 21*b* stops running, and stops emitting the wall-side run signal. Thereafter, the second cleaning robot 21*b* turns in the left direction to make its right side surface become parallel with the wall 2, and stops for the predetermined time. Once the second cleaning robot 21*b* stops emitting the wall-side run signal, the first cleaning robot 21*a* stops running following the second cleaning robot 21*b*. After that, the first cleaning robot 21*a* of Embodiment 2 moves straight ahead for the predetermined time, unlike the first cleaning robot 21*a* of Embodiment 1 changes the run mode into the random run mode.

Subsequently, in FIG. 14, the first cleaning robot 21*a* comes close to the wall 2, and thereby enters into the wall-side run mode. At this time, the first cleaning robot 21*a* emits the wall-side run signal. Upon reception of the wall-side run signal from the first cleaning robot 21*a*, the second cleaning robot 21*b* enters into the following run mode to follow the first cleaning robot 21*a*.

As discussed above, the run modes of the first and second cleaning robots 21*a* and 21*b* are switched in a way that: the first cleaning robot 21*a* having run in the following run mode starts to run in the wall-side run mode; and the second cleaning robot 21*b* having run in the wall-side run mode starts to run in the following run mode.

Using FIGS. 15 and 16, descriptions will be provided for how the above-configured cleaning robot 21 of Embodiment 2 acts in the wall-side run mode and in the following run mode. Incidentally, the basic movement action and the random run mode action of the second cleaning robot 21 of Embodiment 2 are the same as those of the cleaning robot of Embodiment 1.

Figure 15:
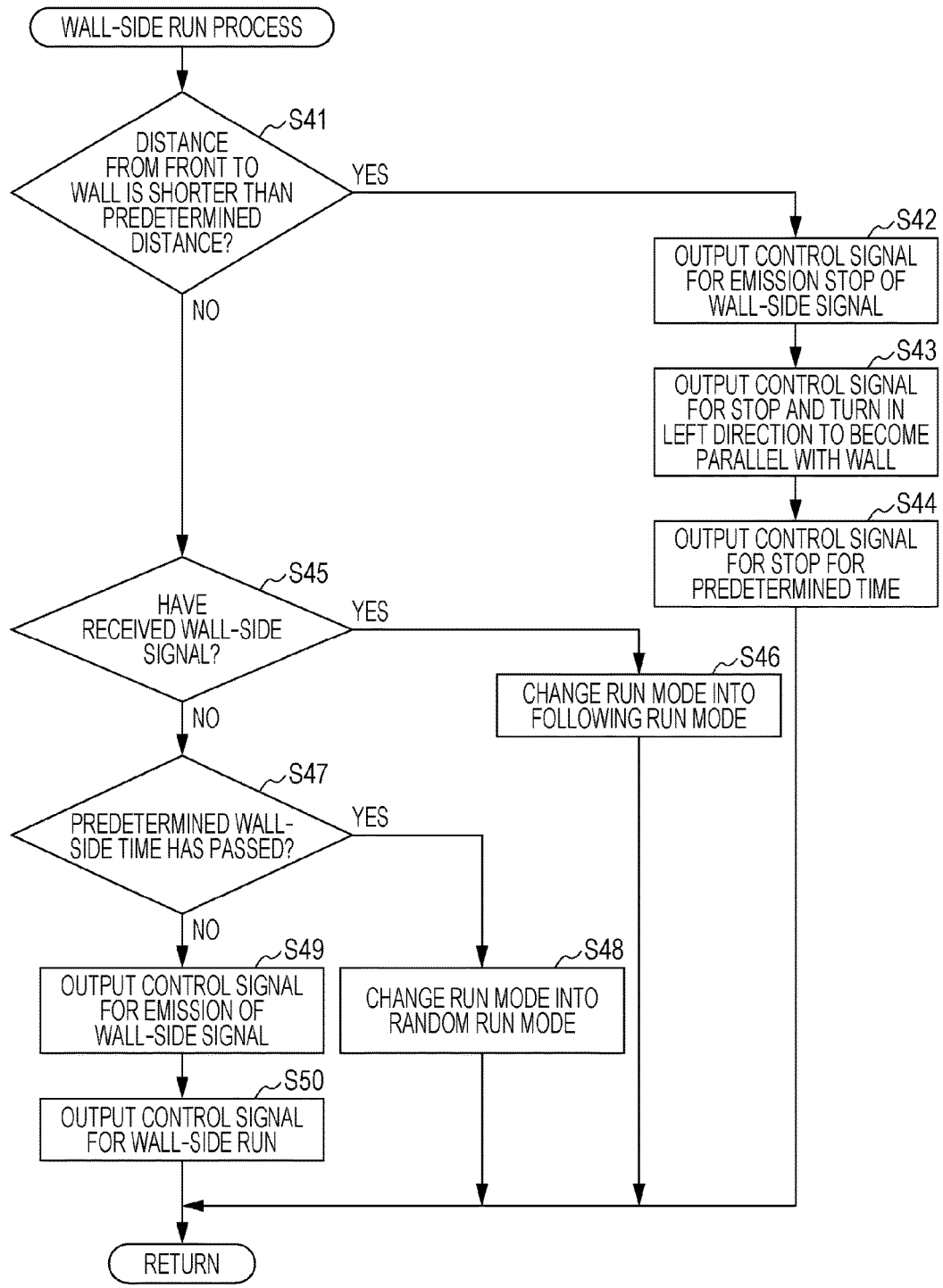
FIG. 15 is a flowchart illustrating an example of a wall-side run process to be performed by the cleaning robot in Embodiment 2.

FIG. 15 is a flowchart illustrating an example of a wall-side run process to be performed by the cleaning robot in Embodiment 2.

The process of step S41 is the same as the process of step S21 in FIG. 10. For this reason, descriptions for the process of step S41 are omitted.

If it is determined that the distance to the wall from the front of the cleaning robot 21 becomes shorter than the predetermined distance (Yes in step S41), the light emission controller 114 outputs to the light emitter 105 a control signal for making the light emitter 105 stop emitting the wall-side run signal in step S42. Upon reception of the control signal, the light emitter 105 stops emitting the wall-side run signal.

The process of step S43 is the same as the process of step S21 in FIG. 10. For this reason, descriptions for the process of step S43 are omitted.

Next, in step S44, the run controller 1121 outputs to the drivers 13 a control signal for making the cleaning robot 21 stop for the predetermined time. Upon reception of the control signal, the drivers 13 make the cleaning robot 21 stop for the predetermined time. Incidentally, in a case where there exists a different cleaning robot which follows the cleaning robot 21, the predetermined time is set long enough for the different cleaning robot to overtake the cleaning robot 21.

On the other hand, if it is not determined that the distance to the wall from the front of the cleaning robot 21 becomes shorter than the predetermined distance (No in step S41), the run controller 1121 determines in step S45 whether a wall-side run signal has been received from the different cleaning robot. In this respect, if it is determined that a wall-side run signal has been received (Yes in step S45), the run controller 1121 changes the run mode into the following run mode in step S46.

On the other hand, if it is determined that no wall-side run signal has been received (No in step S45), the run controller 1121 determines in step S47 whether the randomly-determined predetermine wall-side run time has passed since the cleaning robot 21 starts to run along the wall.

The process of steps S47 to S50 is the same as the process of steps S23 to S26 in FIG. 10. For this reason, descriptions for the process of step S41 are omitted.

Figure 16:
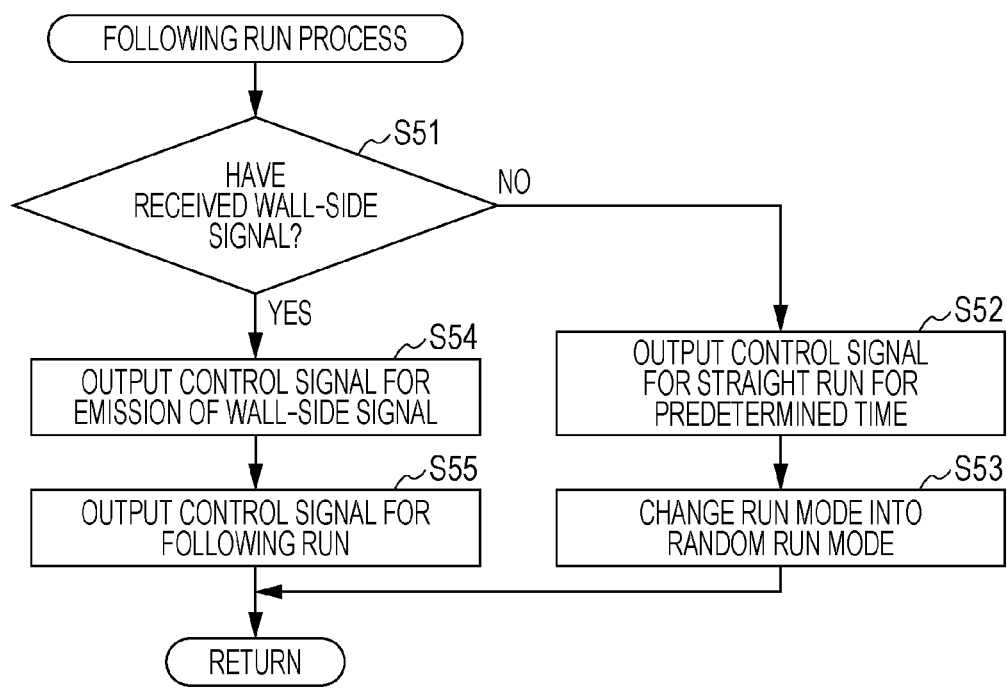
FIG. 16 is a flowchart illustrating an example of a following run process to be performed by the cleaning robot in Embodiment 2.

FIG. 16 is a flowchart illustrating an example of a following run process to be performed by the cleaning robot in Embodiment 2.

The process of step S51 is the same as the process of step S31 in FIG. 11. For this reason, descriptions for the process of step S51 are omitted.

If it is determined that no wall-side run signal has been received (No in step S51), the following run controller 1131 outputs to the drivers 13 a control signal for making the cleaning robot 21 run straight ahead for the predetermined time in step S52. Upon reception of the control signal, the drivers 13 make the cleaning robot 21 run straight ahead for the predetermined time. Incidentally, the predetermined time is set long enough for the cleaning robot 21 to overtake the different cleaning robot which the cleaning robot 21 is following.

The process of steps S53 to S55 is the same as the process of steps S32 to S34 in FIG. 11.

As discussed above, in Embodiment 2, in the case where the front of the second cleaning robot in the wall-side run mode has come close to the wall, the second cleaning robot stops emitting the wall-side run signal, turns to make its side surface become parallel with the wall, and stops there for the predetermined time. Meanwhile, the first cleaning robot having run following diagonally behind the second cleaning robot runs straight ahead for the predetermined time if the first cleaning robot no longer receives the wall-side run signal from the second cleaning robot, and thereafter enters into the wall-side run mode once the first cleaning robot comes close to the wall. Thereafter, when the first cleaning robot starts to run in the wall-side run mode, the second cleaning robot receives the wall-side run signal from the first cleaning robot, enters into the following run mode, and runs following diagonally behind the first cleaning robot.

Thus, in the case where there exists a wall both beside and in front of the second cleaning robot running in the wall-side run mode, in other words, in the case where the second cleaning robot having run in the wall-side run mode reaches a corner of the room, it is possible to prevent the first cleaning robot running in the following run mode from continuing running following the second cleaning robot, and to make the first and second cleaning robots perform their tasks more efficiently by switching the run modes of the first and second cleaning robots.

Embodiment 3

Embodiment 1 has discussed the example where the first cleaning robot runs following diagonally behind the second cleaning robot running along an obstacle. In contrast, Embodiment 3 will describe how the first cleaning robot running following the second cleaning robot acts when an obstacle such as a wall becomes close to an opposite side surface of the first cleaning robot from the second cleaning robot.

Figure 17:
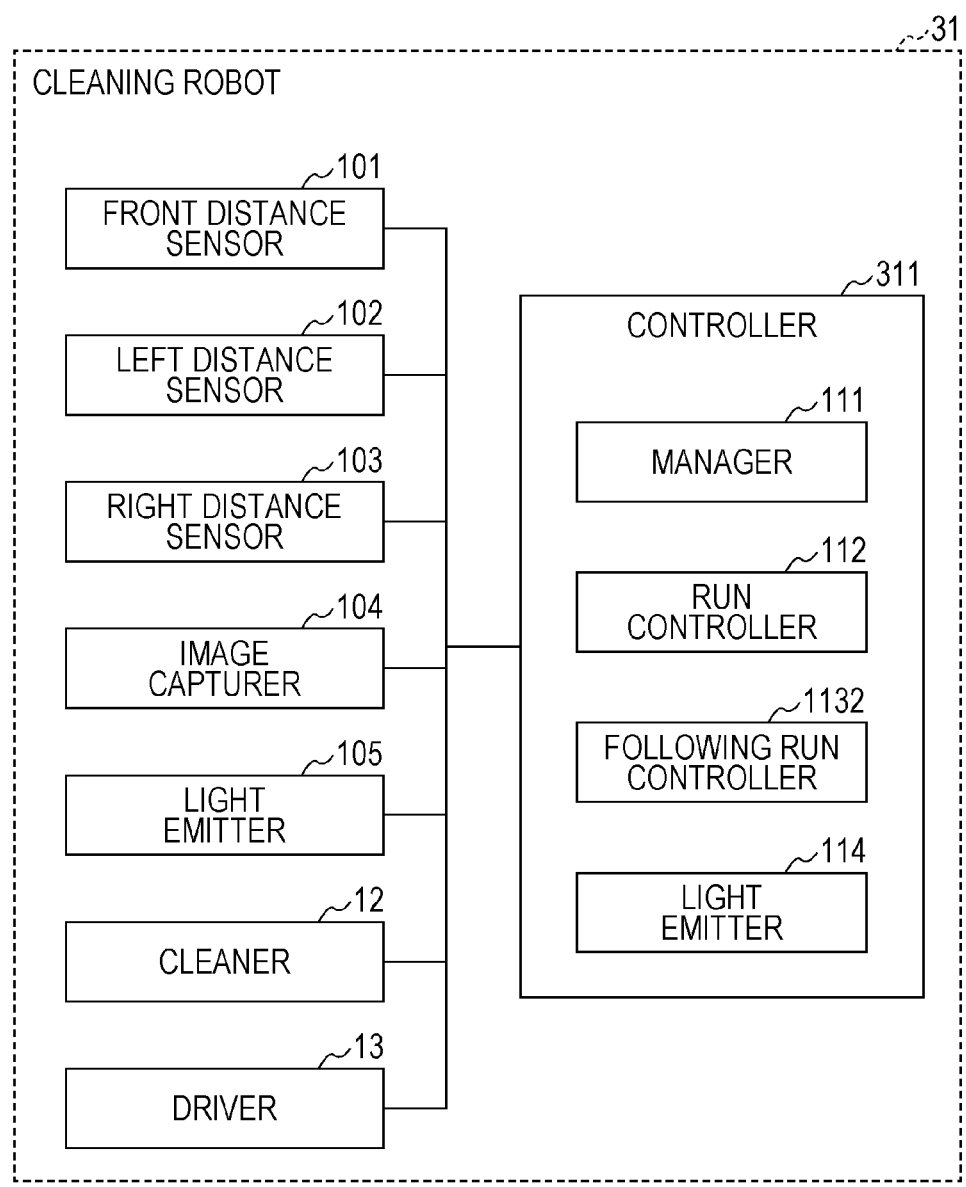
FIG. 17 is a block diagram illustrating an example of a functional configuration of a cleaning robot according to Embodiment 3.

FIG. 17 is a block diagram illustrating an example of a functional configuration of a cleaning robot according to Embodiment 3. Incidentally, in Embodiment 3, components which are the same as those in the cleaning robot 1 of Embodiment 1 are denoted by the same reference signs, and descriptions for such components are omitted.

A cleaning robot 31 illustrated in FIG. 17 includes at least a controller 311, the cleaner 12, the drivers 13, the front distance sensor 101, the left distance sensor 102, the right distance sensor 103, the image capturer 104 and the light emitter 105.

The controller 311 is a CPU, for example. The controller 311 controls the movements of the cleaning robot 31. The controller 311 includes the manager 111, a run controller 112, a following run controller 1132, and the light emission controller 114.

The following run controller 1132 controls the drivers 13 in order for the cleaning robot not to move following a different cleaning robot in a case where: the movement state indicates a movement along an obstacle; and the obstacle is detected beside the opposite side surface of the different cleaning robot.

Next, using FIGS. 18 and 19, descriptions will be provided for how, in the case where the first cleaning robot running in the following run mode is running following the second cleaning robot running in the wall-side run mode, a third cleaning robot acts to start to run following the first cleaning robot.

Figure 18:
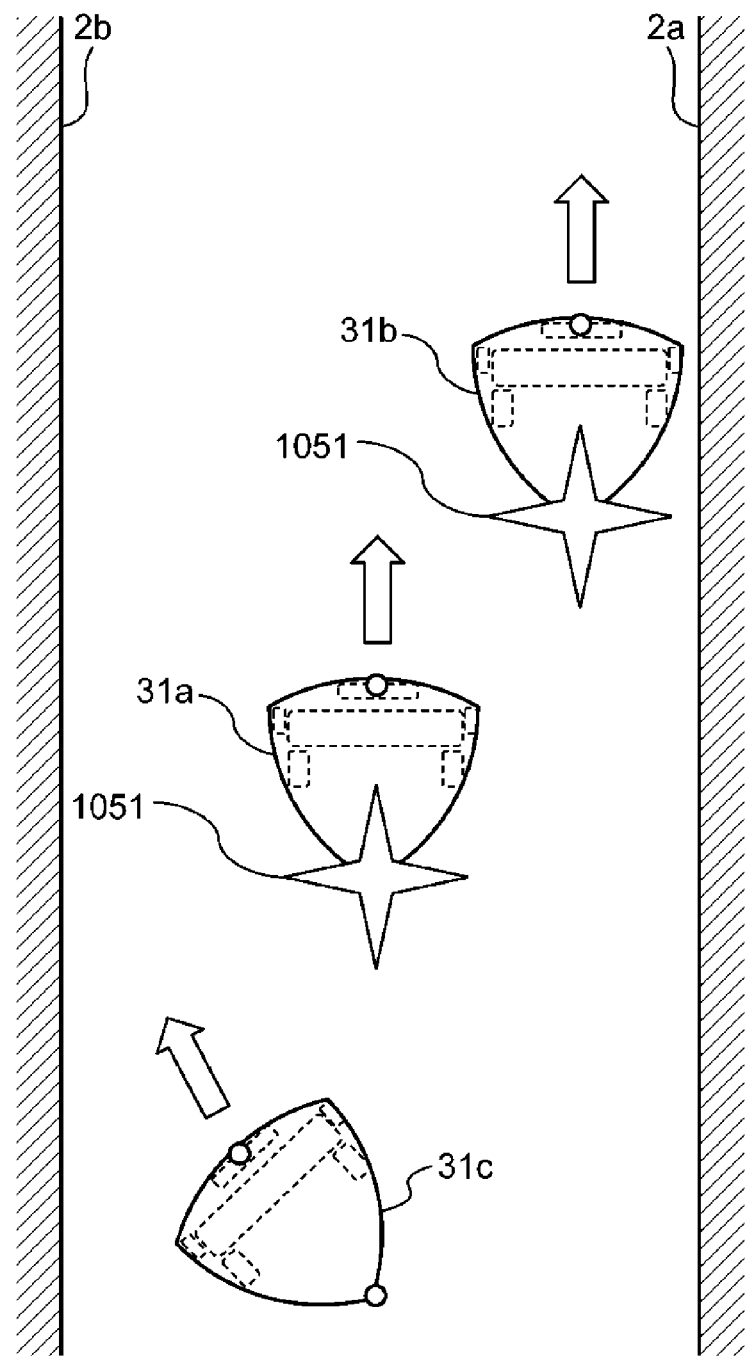
FIG. 18 is a diagram for explaining an example of how a third cleaning robot starts to run following a first cleaning robot in Embodiment 3.
Figure 19:
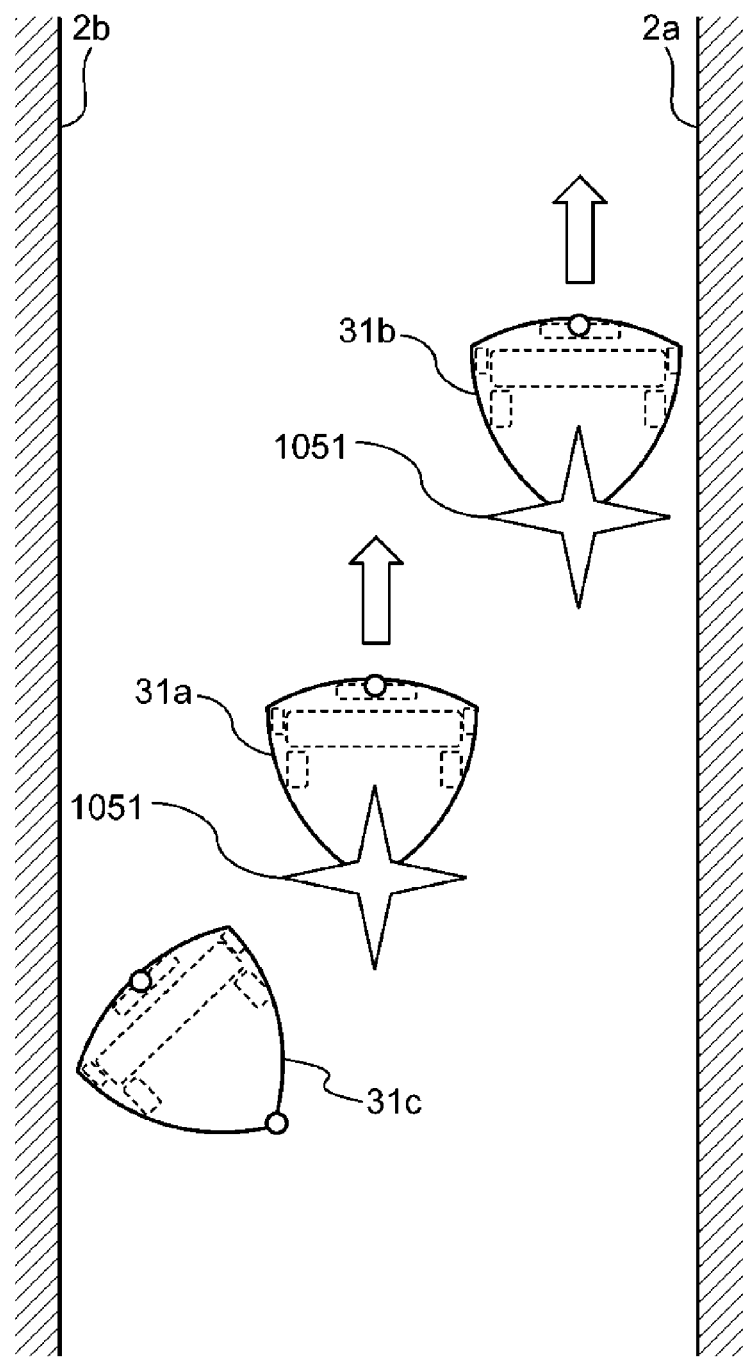
FIG. 19 is a diagram for explaining an example of how the third cleaning robot having started the following run comes close to a wall in Embodiment 3.

FIG. 18 is a diagram for explaining an example of how a third cleaning robot starts to run following a first cleaning robot in Embodiment 3, and FIG. 19 is a diagram for explaining an example of how the third cleaning robot having started the following run comes close to a wall in Embodiment 3.

In FIG. 18, the first cleaning robot 31a is running following diagonally behind the second cleaning robot 31b which is running along a first wall 2a. At this moment, the third cleaning robot 31c receives a wall-side run signal 1051 from the first cleaning robot 31a, changes the run mode into the following run mode, and starts to run following diagonally behind the first cleaning robot 31a.

Subsequently, in FIG. 19, although the third cleaning robot 31c has started to run following diagonally behind the preceding first cleaning robot 31a, the third cleaning robot 31c enters into the random run mode from the following run mode once the third cleaning robot 31c detects a second wall 2b existing at a position facing the first wall 2a is coming closer to the third cleaning robot 31c. Above discussed above, in the case where the width of the passage between the first wall 2a and the second wall 2b is not wide enough for three or more cleaning robots to stand side by side in a width direction of the passage, Embodiment 3 prevents the three or more cleaning robots from running following one another.

Figure 20:
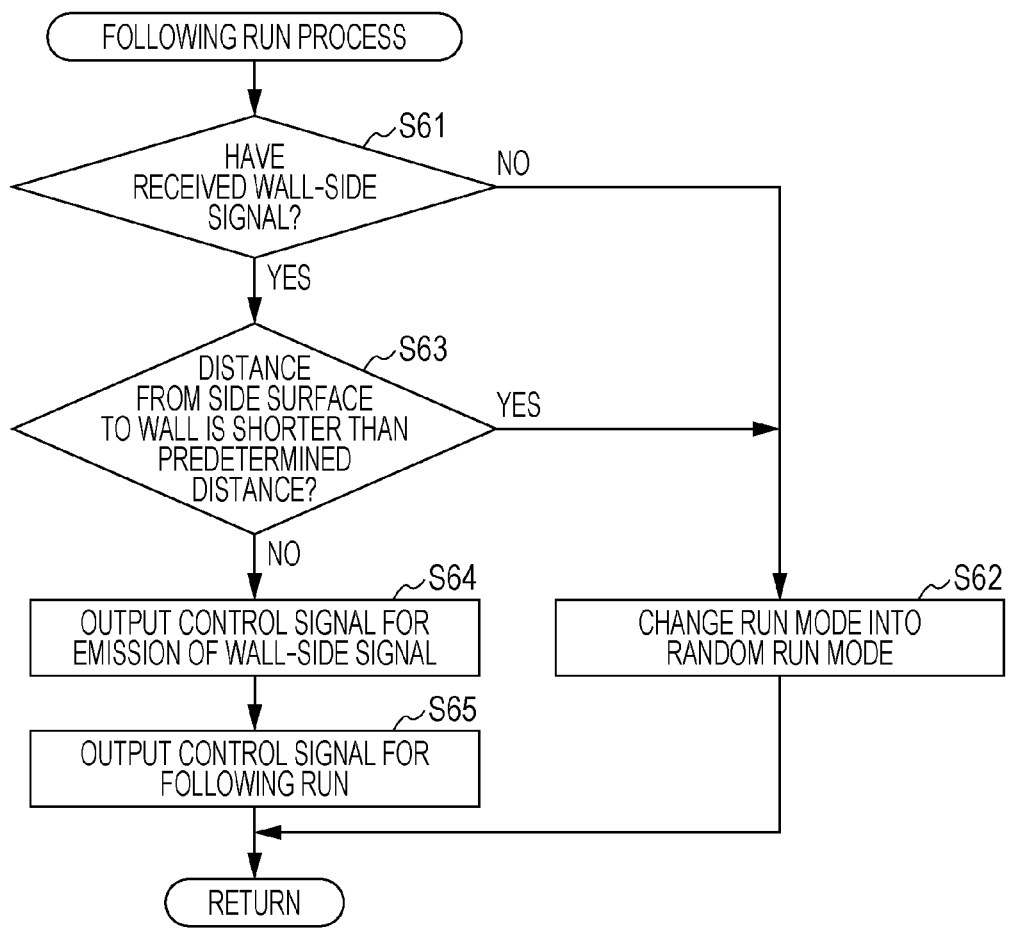
FIG. 20 is a flowchart illustrating an example of a following run process to be performed by the cleaning robot in Embodiment 3.

Using FIG. 20, descriptions will be provided for how the following run mode is performed by the above-configured cleaning robot 31 of Embodiment 3. Incidentally, the basic movement action, the random run mode action and the wall-side run mode action of the cleaning robot 31 of Embodiment 3 are the same as those of the cleaning robot of Embodiment 1.

FIG. 20 is a diagram for explaining an example of a following run process to be performed by the cleaning robot in Embodiment 3.

The process of steps S61 to S62 is the same as the process of steps S31 to S32 in FIG. 11.

If it is determined that the wall-side run signal is received (Yes in step S61), the following run controller 1132 determines in step S63 whether the distance to the wall from the side surface (the left side surface) of the cleaning robot 31 becomes shorter than the predetermined distance, based on sensor data from the left distance sensor 102. In this respect, if it is determined that the distance to the wall from the side surface (the left side surface) of the cleaning robot 31 becomes shorter than the predetermined distance (Yes in step S63), a process of step S62 is proceeded to. On the other hand, if it is not determined that the distance to the wall from the side surface (the left side surface) of the cleaning robot 31 becomes shorter than the predetermined distance (No in step S63), a process of step S64 is proceeded to.

The process of steps S64 to S65 is the same as the process of steps S33 to S34 in FIG. 11.

The above-discussed action of Embodiment 3 makes it possible to prevent the multiple cleaning robots 31 from standing in a narrow passage or the like side by side in the width direction so that persons cannot get through the passage.

In Embodiment 3, the following run controller 1132 of the cleaning robot running following the preceding different cleaning robot determines whether the distance to the wall from the left side surface of the cleaning robot becomes shorter than the predetermined distance, since the preceding different cleaning robot is running while keeping its right side wall parallel with the other wall. The present disclosure, however, is not limited to this particularly. For example, the following run controller 1132 of the cleaning robot running following the preceding different cleaning robot may be configured to determine whether the distance to the wall from the right side surface of the cleaning robot becomes shorter than the predetermined distance, in a case where the preceding different cleaning robot is running while keeping its left side surface parallel with the other wall.

In addition, although in Embodiments 1 and 2, two cleaning robots autonomously move, the present disclosure is not limited to this particularly. Three or more cleaning robots may be configured to move autonomously. Furthermore, although in Embodiment 3, three cleaning robots autonomously move, the present disclosure is not limited to this particularly. Four or more cleaning robots may be configured to move autonomously.

Moreover, although Embodiments 1 to 3 have discussed the cleaning robot that performs the cleaning task while autonomously moving in a predetermined area as one example the autonomously moving body, the present disclosure is not limited to this particularly. The autonomously moving body may be a mowing robot that mows grass while autonomously moving in a predetermined area, a painting robot that paints an object while autonomously moving in a predetermined area, or an inspection robot that inspects surfaces of a structure such as a bridge, a tunnel, a dam and a building. Otherwise, the autonomously moving body may be an unmanned flying vehicle that performs a predetermined task while autonomously flying.

In the present disclosure, all or some of the units, devices, members and sections, or all or some of the functional blocks in the block diagrams illustrated in the drawings may be implemented by one or multiple electronic circuits which include a semiconductor device, a semiconductor integrated circuit (IC) or a large-scale integration (LSI). The LSI or IC may be integrated into one chip, or configured by combining multiple chips. For example, the functional blocks, except the memory elements, may be integrated into one chip. What are herein referred to as an LSI and IC may be a system LSI, a very-large-scale integration (VLSI), or an ultra-large-scale integration (ULSI) because of name changes depending on a degree of integration. A field programmable gate array (FPGA) obtained by programming a logical function in a manufactured LSI, or a reconfigurable logic device containing an LSI whose internal connectivity can be reconfigured, or whose internal circuit partition can be set up may be used for the same purpose.

Furthermore, the functions or operations of all or some of the units, devices, members and sections may be processed by software. In this case, the software is stored in one or more non-transitory recording media such as read-only memories, optical disks and hard disk drives; and when the software is executed by a processor, the functions specified by the software are performed by the processor or a peripheral device. The system or apparatus may include the one or more non-transitory recording media in which the software is recorded, the processor, and needed hardware devices such as an interface.

INDUSTRIAL APPLICABILITY

The autonomously moving body, the movement controlling method and the moving controlling program according to the present disclosure are capable of reducing spots where multiple autonomously moving bodies go through redundantly, and spots where none of the multiple autonomously moving body go through. Accordingly, they are capable of accomplishing the task efficiently. They are useful as the autonomously moving body that performs the predetermined task while autonomously moving, the movement controlling method and the movement controlling program.

What is claimed is:

1. An autonomously moving body which performs a predetermined task while autonomously moving, comprising:
    a driver which makes the autonomously moving body move;
    a moving body detector which detects a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and
    a movement controller which controls the driver in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

2. The autonomously moving body according to claim 1, wherein
    while the autonomously moving body is moving following the different autonomously moving body, if the movement state of the different autonomously moving body becomes no longer the movement state indicating that the different autonomously moving body is moving along the obstacle, the movement controller controls the driver in order for the autonomously moving body to move straight ahead for a predetermined time.

3. The autonomously moving body according to claim 2, further comprising:

a front obstacle detector which detects the obstacle existing in front of the autonomously moving body; and a side obstacle detector which detects the obstacle existing beside a side surface of the autonomously moving body, wherein the autonomously moving body moves along the obstacle as the different autonomously moving body, and while the autonomously moving body is moving along the obstacle as the different autonomously moving body, if the front obstacle detector detects the obstacle in front, the movement controller controls the driver in order for the autonomously moving body to turn until the side obstacle detector detects the obstacle beside the side surface, and thereafter to stop for a predetermined time.

4. The autonomously moving body according to claim 1, further comprising a side obstacle detector which detects the obstacle existing beside a side surface of the autonomously moving body, wherein if the movement state indicates that the different autonomously moving body is moving along the obstacle, and concurrently the obstacle is detected beside the side surface on an opposite side from the different autonomously moving body, the movement controller controls the driver in order for the autonomously moving body not to move following the different autonomously moving body.

5. The autonomously moving body according to claim 1, wherein while moving along the obstacle, the different autonomously moving body sends a first signal from a rear portion of the different autonomously moving body, the first signal indicating that the different autonomously moving body is moving along the obstacle, and the movement body detector detects the movement state by receiving the first signal sent from the different autonomously moving body.

6. The autonomously moving body according to claim 5, further comprising a transmitter which is disposed in a rear portion of the autonomously moving body, and which, upon reception of the first signal sent from the different autonomously moving body, transmits a second signal indicating that the autonomously moving body is moving following the different autonomously moving body.

7. The autonomously moving body according to claim 1, further comprising a cleaner which cleans a floor.

8. A movement controlling method for an autonomously moving body which performs a predetermined task while autonomously moving, comprising:

detecting a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and controlling a driver which makes the autonomously moving body move, in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

9. A non-transitory computer-readable recording medium storing a movement controlling program for controlling movements of an autonomously moving body which performs a predetermined task while autonomously moving, the program executed by a computer included in the an autonomously moving body, and causing the computer to perform a method comprising:

detecting a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and controlling a driver which makes the autonomously moving body move, in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle.

10. An autonomously moving body which performs a predetermined task while autonomously moving, comprising:

processing circuitry; and storage including at least one set of instructions that, when executed by the processing circuitry, cause the processing circuitry to perform operations including:

detecting a movement state indicating whether a different autonomously moving body existing in front of the autonomously moving body is moving along an obstacle, a direction in which the different autonomously moving body exists relative to the autonomously moving body, and a distance between the autonomously moving body and the different autonomously moving body; and controlling a driver which makes the autonomously moving body move, in order for the autonomously moving body to move following the different autonomously moving body while keeping a position diagonally behind the different autonomously moving body at an opposite side of the different autonomously moving body from the obstacle, if the movement state indicates that the different autonomously moving body is moving along the obstacle;

acquiring a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold;

determining, in reverse chronological order from an image corresponding to the last time point in the time series, a position of each of the two or more regions in each of the plurality of consecutive time-series images acquired in the acquiring;

identifying, from among the plurality of consecutive time-series images, a first image corresponding to a first time point for which it has been determined for the first time in the determining that none of the two or more first regions are located on the path, and setting, as a second region, a region between the two or more first regions in the identified first image; and attaching a second annotation to the first image corresponding to the first time point, the second annotation indicating the second region set in the setting.

11. The autonomously moving body according to claim 1, wherein the movement controller is configured to switch a run mode of the autonomously moving body to a run mode that is different from a run mode of the different autonomously moving body.

12. The movement controlling method according to claim 8, further comprises:
switching a run mode of the autonomously moving body to a run mode that is different from a run mode of the different autonomously moving body.

13. The non-transitory computer-readable recording medium according to claim 9, further comprises causing the computer to perform:
switching a run mode of the autonomously moving body to a run mode that is different from a run mode of the different autonomously moving body.

14. The autonomously moving body according to claim 10, further comprises causing the processing circuitry to perform:
switching a run mode of the autonomously moving body to a run mode that is different from a run mode of the different autonomously moving body.

* * * * *